US012226850B2

(12) United States Patent
Lehmann

(10) Patent No.: US 12,226,850 B2
(45) Date of Patent: Feb. 18, 2025

(54) AUTOMATIC CALIBRATION OF A LASER PROCESSING SYSTEM USING AN INTEGRATED TELECENTRIC OPTICAL DETECTOR WITH LIMITED DEGREES OF FREEDOM

(71) Applicant: RAYLASE GmbH, Wessling (DE)

(72) Inventor: Wolfgang Lehmann, Germering (DE)

(73) Assignee: RAYLASE GmbH, Wessling (DE)

( * ) Notice: Subject to any disclaimer, the term of this patent is extended or adjusted under 35 U.S.C. 154(b) by 855 days.

(21) Appl. No.: 17/287,545

(22) PCT Filed: Oct. 11, 2019

(86) PCT No.: PCT/EP2019/077576
§ 371 (c)(1),
(2) Date: Apr. 22, 2021

(87) PCT Pub. No.: WO2020/099038
PCT Pub. Date: May 22, 2020

(65) Prior Publication Data
US 2021/0323087 A1    Oct. 21, 2021

(30) Foreign Application Priority Data

Nov. 12, 2018    (EP) .................................... 18205647
Dec. 13, 2018    (EP) .................................... 18212406

(51) Int. Cl.
*B23K 26/03* (2006.01)
*B22F 10/28* (2021.01)
(Continued)

(52) U.S. Cl.
CPC ............ *B23K 26/032* (2013.01); *B22F 10/28* (2021.01); *B22F 10/31* (2021.01); *B22F 12/45* (2021.01);
(Continued)

(58) Field of Classification Search
CPC ... B29C 64/209; B29C 64/227; B29C 64/232; B29C 64/236; B29C 64/25;
(Continued)

(56) References Cited

U.S. PATENT DOCUMENTS 6,483,596 B1    11/2002  Philippi et al.
2015/0135897 A1*  5/2015  Sutcliffe ............ B23K 15/0086
                                                    206/524.1
(Continued)

FOREIGN PATENT DOCUMENTS

| CN | 108698164 A | 10/2018 |
| WO | 2015040185 A1 | 3/2015 |
| WO | 2017187147 A1 | 11/2017 |

OTHER PUBLICATIONS

International Search Report & Written Opinion of the International Searching Authority dated Jan. 17, 2020 for International Application No. PCT/EP2019/077576.

*Primary Examiner* — Janie M Loeppke
*Assistant Examiner* — Simpson A Chen
(74) *Attorney, Agent, or Firm* — Eschweiler & Potashnik, LLC

(57) ABSTRACT

The present invention relates to a laser processing system comprising a frame structure; a work base for supporting a work material, wherein the work base defines a work field in a work plane, wherein the work plane is parallel to the work base; at least one laser device for projecting work light on the work plane and/or on the work material, when the work material is disposed on the work base, wherein the at least one laser device is attached to the frame structure; wherein each laser device is configured for generating one or more reference marks on the work material and/or on the work plane within the corresponding laser field, wherein the laser field corresponds to at least a part of the work field; an optical detector for scanning the work field for detecting at (Continued)

least a part of the one or more reference marks generated by each laser device, wherein the optical detector is movable with respect to the frame structure with not more than two, preferably not more than one, degree of freedom; and a control unit functionally connected to the optical detector and the at least one laser device, wherein the control unit is configured for calibrating the at least one laser device based on the reference marks detected by the optical detector. The invention further refers to a related method of calibrating one or more laser devices of a laser processing system.

20 Claims, 7 Drawing Sheets

(51) Int. Cl.
| | | |
|---|---|---|
| *B22F 10/31* | (2021.01) | |
| *B22F 10/366* | (2021.01) | |
| *B22F 12/00* | (2021.01) | |
| *B22F 12/45* | (2021.01) | |
| *B22F 12/90* | (2021.01) | |
| *B23K 26/04* | (2014.01) | |
| *B23K 26/70* | (2014.01) | |
| *B29C 64/153* | (2017.01) | |
| *B29C 64/393* | (2017.01) | |

(52) U.S. Cl.
CPC ............. *B22F 12/90* (2021.01); *B23K 26/04* (2013.01); *B23K 26/707* (2015.10); *B29C 64/393* (2017.08); *B22F 10/366* (2021.01); *B22F 12/38* (2021.01); *B29C 64/153* (2017.08)

(58) Field of Classification Search
CPC ............... B29C 64/393; B29C 64/153; G05B 2219/37067; G05B 2219/37129; G01S 7/4972; G01S 7/497; B22F 10/31; B22F 12/45; B22F 12/90; B22F 10/28; B22F 12/38; B22F 10/366; B23K 26/032; B23K 26/707; B23K 26/04
USPC .................................................... 219/121.83
See application file for complete search history.

(56) References Cited

U.S. PATENT DOCUMENTS

| | | | |
|---|---|---|---|
| 2017/0205623 A1* | 7/2017 | Small | G02B 26/105 |
| 2017/0210075 A1* | 7/2017 | Sanz Ananos, Jr. | B29C 64/165 |
| 2018/0147658 A1* | 5/2018 | Shapiro | B23K 26/0853 |
| 2018/0297114 A1* | 10/2018 | Preston | B29C 64/165 |
| 2018/0354034 A1* | 12/2018 | Vaes | B29C 64/277 |
| 2020/0023585 A1 | 1/2020 | Wiesner et al. | |

* cited by examiner a)
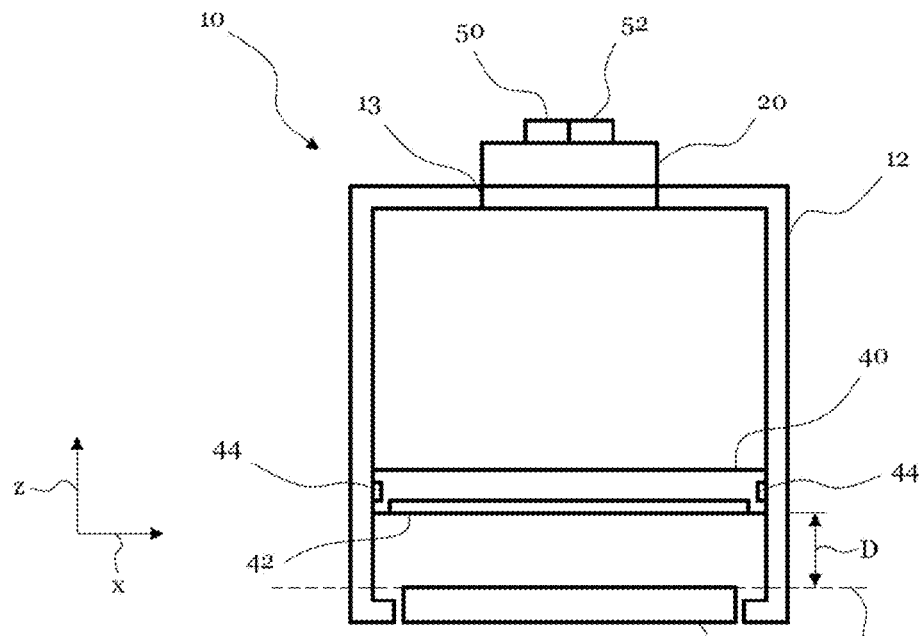
b)
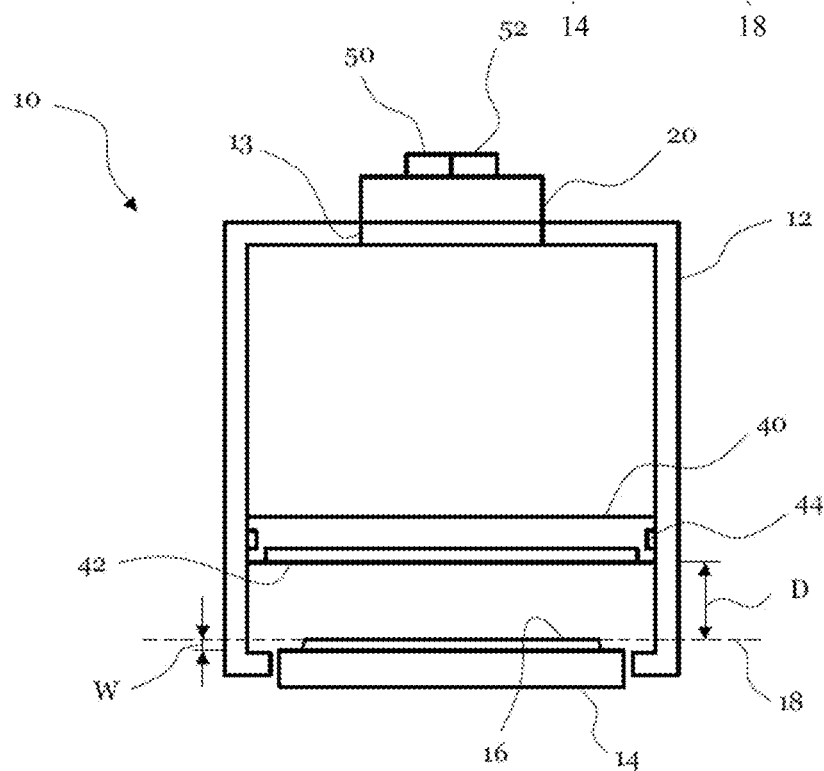
Fig. 1 a)
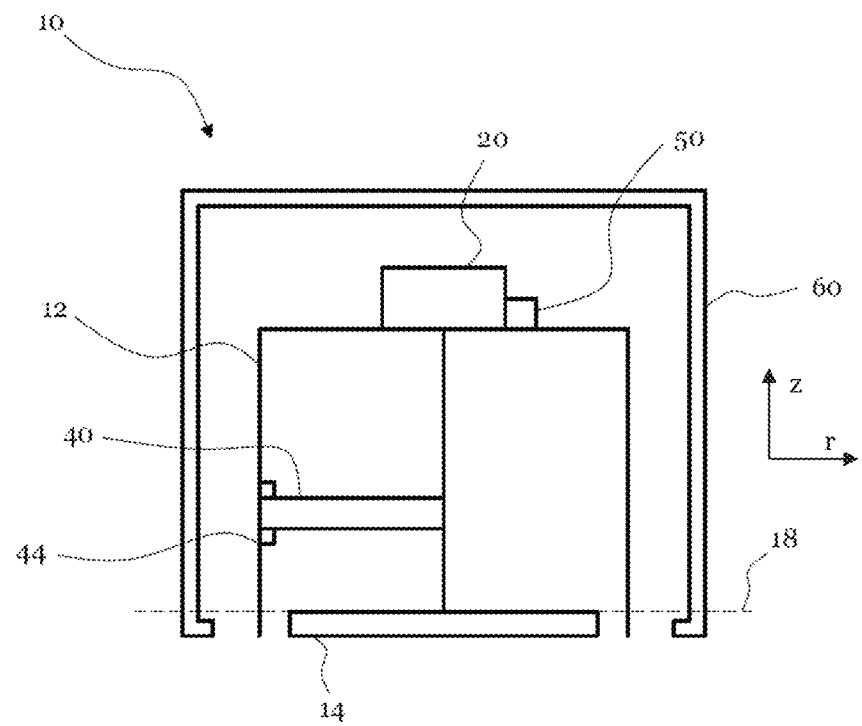
b)
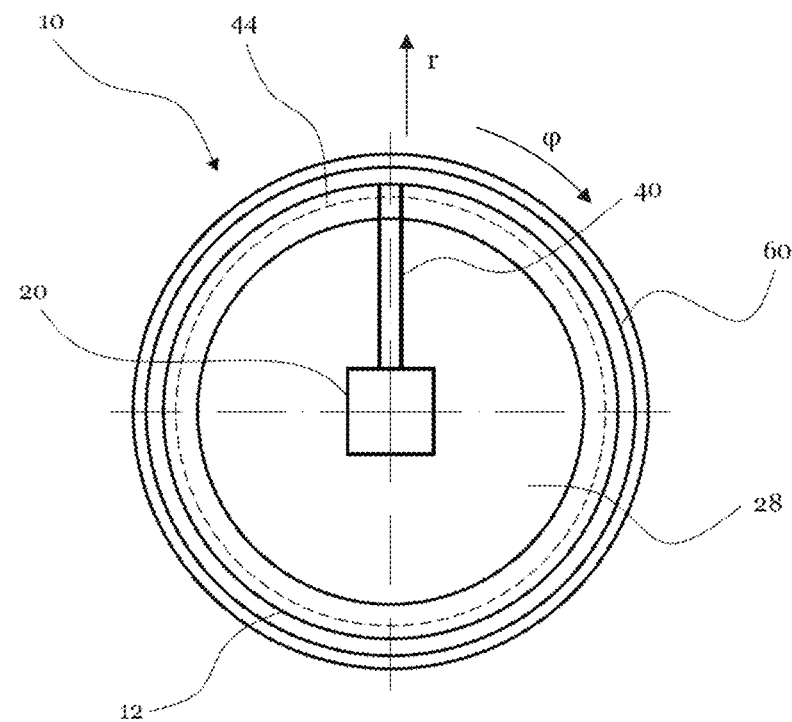
Fig. 4

AUTOMATIC CALIBRATION OF A LASER PROCESSING SYSTEM USING AN INTEGRATED TELECENTRIC OPTICAL DETECTOR WITH LIMITED DEGREES OF FREEDOM

This Application is a National Phase Entry of PCT/EP2019/077576, filed on Oct. 11, 2019, which claims priority to European Application number 18205647.3, filed on Nov. 12, 2018 & European Application number 18212406.5, filed on Dec. 13, 2018. The contents of the above-referenced Patent Applications are hereby incorporated by reference in their entirety.

FIELD OF THE INVENTION

The present invention is in the field of additive manufacturing and relates to a laser processing system and a method for calibrating a laser processing system.

BACKGROUND OF THE INVENTION

Additive manufacturing processes are an example of laser processing processes. In additive manufacturing processes, a work material is added and laser processed layer by layer to manufacture a target workpiece out of the work material. Additive manufacturing is gaining more and more importance in industrial production compared to classical subtractive manufacturing processes such as milling, drilling and turning, in which material is removed to produce a workpiece. Layer-based construction, which is characteristic of additive manufacturing processes, enables the production of highly complex geometric structures with a high degree of design space that subtractive processes cannot achieve.

The increase in the industrial significance of additive manufacturing processes is driven by the increasing efficiency of laser sources used for laser processing a material. Accordingly, the market is currently experiencing a transition from the original use of additive manufacturing processes only for the production of prototypes, "rapid prototyping", to a mass industrial use of this technology for series production, "rapid manufacturing". This development is observed in numerous branches of industry, such as the aerospace industry, the automotive industry, medical technology and prosthetics.

A special type of additive manufacturing relates to powder-bed-based processes in which a powdered starting material is applied layer by layer onto a workpiece to be manufactured and thermally processed or melted by controlled laser light. The powder layers typically have thicknesses in the micrometre range.

The possibility of parallel or simultaneous processing of one or several workpieces by a plurality of laser devices, through which higher output rates can be achieved, plays an important role in increasing the efficiency of laser processing systems for powder bed-based additive manufacturing of workpieces.

In other laser processing processes, like plastic laser processing, paper board laser processing, laser micromachining, laser marking, laser photovoltaic processing, laser wafer production, laser processing of glassware and displays, laser structuring of ITO and LDS, and laser welding, to cite some examples, multiple laser devices may also be comprised.

In any case, the combined use of multiple laser devices to simultaneously produce one or more workpieces or to simultaneously carry out one or more laser processes requires accurate calibration and adjustment of the individual laser devices and a precise synchronization of the laser devices with each other. For example, it needs to be made sure, that transitions between a first laser field covered by a first laser device and a second laser field covered by a second laser device are smooth and precise enough for the transition not to be perceivable in the finalised product of the laser process, like a finalised workpiece, a laser processed plastic, a finalised laser produced wafer and the like.

During operation, any laser processing system is subject to thermally driven fluctuations caused, for instance, by heat produced by the laser devices or by the electronic workpieces of the system. These fluctuations can affect the accuracy of the laser devices, for example in the form of offset drifts and gain drifts. Offset drift happens when a point of the work field aimed at by a laser device moves in relation to the geometry of the system, such that the point which the light emitted by a laser device actually reaches may differ from the point aimed at. Gain drift happens when fluctuations in the size of the system and/or in the working distance of a laser device, i.e. in the distance between the laser device and the work field, cause variations in the virtual size of the corresponding laser field and/or in the so-called "spot size" of the laser beams used in the system. Gain drift may also be related to fluctuations in an angle of incidence of the light emitted by a laser with respect to the work plane. Gain drift usually manifests as a squeezing or stretching along one or both image field axes of the corresponding laser field.

Due to the aforesaid fluctuations and the possibly resulting drifts, and in spite of an appropriate initial calibration of the system for initially adjusting the settings of the laser devices, any laser processing system may be exposed to a progressive loss of accuracy, especially when a plurality of laser devices are configured for operating in parallel. Therefore laser processing systems, in particular any laser devices thereof, need to be calibrated, not only before starting operation, but also repeatedly during operation of the system.

Typically, the calibrations or recalibrations that may be necessary during the operation of the system are carried out by means of a comparison of reference marks generated by the laser devices of the system as light marks, for instance reference marks "burn" in a laser sensitive marking paper, with predefined reference marks that are typically provided in the form of thermally stable reference patterns, for example glass plates. The reference marks can be compared to the predefined reference marks by means of a suitable software tool and of suitable measuring equipment, such as zooming optics and high precision cameras. However, such traditional calibration processes usually involve several time-consuming iterations and often require the intervention of a human operator, for example for providing and removing a marking paper or a reference plate and for preparing and carrying out the aforesaid measurements using the software tool and the measuring equipment.

Therefore, there is room for technical improvement in the field of the calibration and synchronisation of laser processing systems.

SUMMARY OF THE INVENTION

The invention refers to a laser processing system, for example an additive manufacturing system, comprising a frame structure and a work base for supporting a work material, wherein the work base defines a work field in a work plane, wherein the work plane is parallel to the work base. The work base defines the work field in the sense that the work field is coplanar with the work plane and hence parallel to the work base. A "frame structure" refers herein to any support structure for the components of a laser processing system and may, without limitation, comprise a casing or housing enclosing at least in part the work base and/or other components of the system, or a structure separate and independent from a housing. In other words, the support structure may be enclosed by an independent housing but may also be formed as a housing.

The work material may comprise a material suitable for being laser processed, for example to produce one or more workpieces by additive manufacturing. The work material may hence correspond to a work material powder for additive manufacturing. However, in other laser processing applications, the work material may correspond to any material suitable for being laser processed, like a plastic material, a paper board, a micromachined device, a semiconductor device, for instance a semiconductor wafer, an electronic device, for instance an OLED display, a fuel cell or the like.

The work base may have a planar form and may define a work plane that comprises the work field, such that the work plane is parallel to the work base. Although the work base may coincide, i.e. be coplanar, with the work plane, when no work material is disposed on the work base, this is not necessarily the case. For example, when work material is disposed on the work base, an uppermost surface or layer of the work material may coincide with the work plane, at least within a predetermined depth tolerance, wherein the predetermined depth tolerance may be between 5 µm and 500 µm, preferably between 10 µm and 200 µm.

The system further comprises at least one laser device for projecting work light on the work plane and/or on the work material, when work material is disposed on the work base. The system may comprise, without limitation, one, two, three, four, six or eight laser devices, although other configurations with a different number of laser devices are also possible. The at least one laser device may be attached to the frame structure. The at least one laser device may be rigidly attached to the frame structure. This may allow the at least one laser device to "follow" thermodynamically caused fluctuations of the frame structure, i.e. to deform, drift and/or vary in size like the frame structure.

In some embodiments, the laser processing system may be an additive manufacturing system and the at least one laser device may be configured for laser processing the work material with work light within a laser field for generating one or more workpieces. The one or more workpieces are then generated on the work field. The laser field of a laser device corresponds to a plane in which the work light emitted by said laser device is focused, at least within a predefined tolerance. The system may be configured to form one workpiece or a plurality of workpieces, wherein the workpieces may be identical to each other or different from each other. "Workpiece" may refer herein to a finalised workpiece that no longer requires any laser processing or to a workpiece that is still being formed in the system.

However, the laser processing system of the invention is not limited to additive manufacturing systems and may correspond to any system based on laser processing a work material by means of at least one laser device, such as, for instance any of: a laser processing system for plastic web scribing, perforation and/or cutting, for instance for the production of plastic packaging; a laser processing system for paper board "roll to roll" cutting applications or paper board sheet cutting applications, for instance for the production of packagings; a laser processing system of a digital printer; a laser processing system for precise laser micromachining, for example for cutting, ablating, etching, structuring and/or welding; a laser processing system for laser marking; a laser processing system for photovoltaic processes, for example PERC (Passivated Emitter and Rear Cell)-technology-based processes; a laser processing system for wafer production; a laser processing system for laser processes on glassware and displays, like OLEDs; a laser processing system for ITO- and/or LDS structuring applications; a laser processing system for high-power high-precision welding, for example for fuel cell welding. However, it will be clear to the skilled person that the present invention is also applicable to further processing systems, other than those previously mentioned.

Each of the at least one laser device may be configured for laser processing the work material with work light within a corresponding laser field. "Work light" refers herein to laser light suitable for laser processing the work material and/or for generating reference marks. The work light may in particular be in a wavelength range between 0.1 µm and 25 µm, preferably between 0.2 µm and 11 µm.

"Laser device" refers herein to any light-emitting device suitable for generating work light in a controlled manner such that the work light might be emitted in a controllable direction. The at least one laser device may in particular comprise a laser source and movable mirrors and galvanometers for controlling and directing the emission of work light. For the system described herein, the laser devices described in the patent applications DE 10 2016 120 523 and WO 2018/078137 may be particularly suitable. However the present disclosure is not limited thereto and the use of other laser devices is also possible.

The at least one laser device is attached to the frame structure such that a position of the at least one laser device with respect to the frame structure is fixed. However the at least one laser device may be orientable, for example rotatable, to direct the work light emitted for being projected onto the work field.

The work base defines a work field within which the work material can be laser processed, i.e. within which the work material is within reach of one or more of the at least one laser device. Each laser device may process the work material within a corresponding laser field.

Each laser device is configured for generating one or more reference marks on the work material and/or on the work plane within the corresponding laser field, wherein the laser field corresponds to at least a part of the work field. A "reference mark" may refer herein to any durable mark generated on the work material and/or in any other object or material arranged on the work plane that may be detected by optical means or by any other means. For example, the reference marks may comprise perforations or deformations of the work material or of a marking paper arranged on the work base generated by the work light emitted by the at least one laser device. Notably, if a laser sensitive material is arranged on the work base, the said laser sensitive material may be aligned with and be coplanar with the work plane. The at least one laser device may be configured for generating cross-shaped reference marks, although other shapes of the reference marks, for example circular, polygonal or point-shaped, are also possible.

Each laser device may be configured for generating at least three, preferably at least four, reference marks on the work material and/or on the work plane within the corresponding laser field.

Each laser field corresponds to at least a part of the work field. Each laser field may overlap partly or completely with the work field. This means that the each laser field may cover the entire work field or a part thereof, and that a total area covered by all laser fields, i.e. the sum of the areas covered by each of the laser fields, may correspond to the entire work field or to a part thereof. In some embodiments, the system may comprise laser devices having corresponding laser fields that do not completely cover the entire work field. For example, if a system comprises more than one laser device, the laser field of each of the laser devices may cover only a part of the work field of the system, and the surface covered by all laser fields may correspond to the entire work field or to a part thereof.

In some embodiments, one or more of the laser fields and the work field may have different shapes and sizes. For example, the work field may have circular shape and the laser fields may have a square or quadrangular shape. In some embodiments, the work field may be comprised within one or more of the laser fields. For instance, a circular work field may be comprised within one or more square or quadrangular laser fields, wherein the laser fields extend on the work plane or parallel to the work plane beyond the work field.

Thus, for each laser field, at least a part of the laser field may not overlap with the work field. Since each laser field is configured for generating reference marks within the corresponding laser field, this means that at least some of the reference marks may be generated outside of the work field, in a part of the laser field not overlapping with the work field.

Preferably, the reference marks generated by the at least one laser device are generated outside of the work field and/or in parts of the work field in which the work material is to be removed by laser processing for forming the one or more workpieces. This has the advantage of avoiding traces of reference marks in the finalized workpiece.

The system further comprises an optical detector for scanning the work field configured for detecting at least a part of the one or more reference marks generated by each laser device, wherein the optical detector is movable with respect to the frame structure with not more than two, preferably not more than one, degree of freedom. The movement of the optical detector is restricted with respect to the frame structure in one direction or dimension, if the optical detector is movable with two degrees of freedom. If the optical detector is movable with one degree of freedom, the movement of the optical detector is restricted with respect to the frame structure in two directions or dimensions.

Notably, "direction" or "dimension" may refer to directions or dimensions in a Cartesian coordinate system or in any other coordinate system. For example, if the movement of the optical detector with respect to the frame structure is described using a Cartesian coordinate system in three dimensions corresponding to three mutually perpendicular directions (cf. x, y and z, or "length", "width" and "height"), the aforesaid not more than two, preferably not more than one, degree of freedom, may correspond, respectively, to not more than two or not more than one corresponding directions. For example, if the optical detector is movable with respect to the frame structure with two degrees of freedom, the optical detector may be fixed with respect to the frame structure in the Z direction and be movable in the x and y directions. If the optical detector is movable with respect to the frame structure with one degree of freedom, the optical detector may be fixed with respect to the frame structure in two directions and movable in only one direction. For instance, the optical detector may be fixed with respect to the frame structure in the Y and Z directions and movable in the X direction.

However, "direction" or "dimension" need not refer to mutually perpendicular directions or dimensions in a Cartesian coordinate system and may also refer to mutually perpendicular directions in a cylindrical coordinate system, a spherical coordinate system, or any other coordinate system. For instance, if the movement of the optical detector with respect to the frame structure is described using cylindrical coordinates in three dimensions corresponding to a radial distance, an angular coordinate and a height (cf. r, $\varphi$, z), the aforesaid not more than two, preferably not more than one, degrees of freedom, may correspond, respectively, to not more than two or not more than one corresponding (cylindrical) directions. For example, if the optical detector is movable with respect to the frame structure with two degrees of freedom, the optical detector may be fixed with respect to the frame structure in the Z direction (height) and be movable in the radial (r) and angular ($\varphi$) "directions". If the optical detector is movable with respect to the frame structure with one degree of freedom, the optical detector may be fixed with respect to the frame structure in the radial (r) and height (z) directions and be movable only in the angular direction ($\varphi$). The extension of the above to further coordinate systems is straightforward to the skilled person.

If the movement of the optical detector with respect to the frame structure is restricted in one direction, the optical detector is fixed with respect to the frame structure in one direction, i.e. the movement of the optical detector has no degree of freedom in this direction or dimension. This means that the optical detector is fixed or attached with respect to the frame structure, preferably rigidly attached, in such a way, that a position of the optical detector with respect to the frame structure is not variable in this direction or dimension. For example, if the optical detector has no degree of freedom, i.e. is restricted, in a direction Y of a Cartesian coordinate system or in the radial direction r of a cylindrical coordinate system, the position of the optical detector with respect to the frame structure may be described in the corresponding coordinate system having a constant value of the corresponding coordinate, y for the Cartesian coordinate system and r for the cylindrical coordinate system.

The system further comprises a control unit functionally connected to the optical detector and the at least one laser device, wherein the control unit is configured for calibrating the at least one laser device based on the reference marks detected by the optical detector. The control unit may be comprised in the system or may be external to the system. The control unit may comprise one or more of a CPU, a computer, integrated circuits, a memory storage device.

The control unit may comprise a processor on which suitable software can be executed and a memory in which the software may be stored, wherein said suitable software may cause the control unit to calibrate the at least one laser device based on the reference marks detected by the optical detector in a way accessible to the skilled person.

The control unit may be configured for comparing a measured position of each of the reference marks to position of the work field that was aimed at by the corresponding laser device when emitting the work light that generated the respective reference marks. This comparison of actual measurements versus intended positions allows for a readjustment of the calibration settings of the at least one laser device.

By means of an optical detector having a restricted freedom of movement with respect to the frame structure, the system of the invention achieves an improved degree of accuracy and automatization for the calibration process. Each direction or dimension in which the optical detector has no degree of freedom with respect to the frame structure, i.e. each direction or dimension in which a movement of the optical detector with respect to the frame structure is restricted, eliminates a possible source of variability and imprecision for the detection of the reference marks, on which the calibration is based.

Since the optical detector is movable with respect to the frame structure with no more than two degrees of freedom or, preferably, no more than one degree of freedom, the position of the optical detector with respect to the frame structure, to which the at least one laser device is attached, is fixed, respectively, in at least one direction or dimension or, preferably, in at least two directions or dimensions. This allows better correlating the reference marks detected by the optical detector to absolute positions in the work field. Therefore, the system of the invention achieves an improved reliability for processing and detecting reference marks in the work field and for comparing the positions of the measured reference marks to intended absolute positions. This allows better accounting for offset drifts, gain drifts and any other distorting phenomena related to thermal fluctuations of the system.

Since the reference marks are detected by an optical detector that is independent from the at least one laser device, different positions of the work field can be reliably tracked in absolute terms without relying on the settings of the at least one laser device for detection purposes. This allows for an improved accuracy in the calibration of the at least one laser device, since possible error sources introduced by the at least one laser devices themselves when measuring the reference marks are not taken into account.

The optical detector and/or the control unit may be configured such that the optical detector detects all or only a part of the one or more reference marks generated by the at least one laser device. If only a part of the one or more reference marks generated by the at least one laser device is detected by the optical detector, and said reference marks are located within a part of the work field, the control unit can be configured to move the optical detector only across said part of the work field, such that the optical detector only scans said part of the work field. Reference marks located outside the aforesaid part of the work field may be omitted in order to increase the rapidity and simplicity of the measurement by the optical detector. In some embodiments, the system may be configured such that the optical detector detects at least one, preferably at least two, more preferably at least three or at least four reference marks generated by each of the at least one laser devices.

In the system of the invention, the optical detector may be used for an initial calibration of the system, wherein reference marks are generated, by each of the at least one laser device, before a work material is provided on the work base, on a calibration plate. However, an initial calibration may also be based on reference marks generated on the work material, the work base, or any other object. Such initial calibration may result in the correction of an "ideal" image or map of the work field stored in the control unit and/or used by the control unit in a system specific way taking into account the reference marks detected by the optical detector during the initial calibration.

A calibration plate for an additive manufacturing system may comprise a substrate and a layer of laser sensitive material arranged on the substrate. The substrate may be of a thermally stable material, such that the substrate is not sensitive to the work light emitted by the at least one laser device and may be resistant to thermal fluctuations such as deformations. The substrate may be of glass, for example of quartz glass, The layer of laser sensitive material may comprise a material sensitive to the work light, such that reference marks may be formed on the layer of laser sensitive material by the at least one laser device of the system. The layer of laser sensitive material may be a multilayer structure. For example, the layer of sensitive material may comprise a first layer and an underlying second layer arranged on the first layer. The first layer may comprise a plastic material and/or an organic material. The underlying second layer may comprise a plastic material, a wax paper and/or an organic material. Work light incident on the layer of laser sensitive material may remove the laser sensitive material and reveal an underlying material. Said underlying material may be the substrate or an underlying layer of the layer of laser sensitive material.

Preferably, the substrate and/or the underlying layer may be mostly reflective in the visible part of the spectrum and the layer of laser sensitive material may be mostly absorbing in the visible part of the spectrum, such that an optical contrast can be generated between the substrate and/or the underlying layer and the layer of laser sensitive material in regions of the calibration plate in which the layer of laser sensitive material is removed by work light. For example, the substrate and/or the underlying layer may be bright, for instance white, and the laser sensitive material may be dark, for instance black. The optical detector may be further configured to detect the aforesaid reference marks generated by the at least one laser device on the calibration plate and the control unit may be configured to base the initial calibration thereon.

The calibration plate may be configured such that the layer of laser sensitive material may be replaced by removing a layer of laser sensitive material that has already been used for generating reference marks and arranging a new layer of laser sensitive material on the substrate.

After an initial calibration of the at least one laser device based on the calibration plate, the calibration plate may be removed from the system. Alternatively, the calibration plate may remain on the work base, such that layers of work material that are subsequently dispensed on the work base may be supported, at least in part, by the calibration plate.

The use of a calibration plate may allow for a better resolution of the reference marks as compared to reference marks formed on the work material, and may hence allow for a greater accuracy in the initial calibration.

In preferred embodiments of the invention, the work base may comprise one or more predefined reference marks. The predefined reference marks may be provided, for example, in the form of drill holes, marking nuts, gratings, protrusions, incisions, or the like, which may be formed by a manufacturer of the system. The optical detector may be configured to detect the aforesaid predefined reference marks formed in the work base, and the control unit may be configured to base an initial calibration of the at least one laser device on the predefined reference marks.

In the system of the invention, the optical detector may also be used for subsequent calibrations or recalibrations, wherein reference marks are generated by each of the at least one laser device on the work material and/or on the work field, whereupon the reference marks are detected by the optical detector. "Subsequent calibrations" or "recalibrations" refer herein to calibrations carried out after an initial operation of the system, for example after at least one layer of work material has been laser processed by the at least one laser device, for example if the work material corresponds to a work material powder, or when a new work material unit or part, such as a portion of a paper board or a semiconductor wafer has been laser processed by the at least one laser device. The optical detector may detect the reference marks generated by the at least one laser device on the work material and/or on the work field and base a recalibration thereon. Such subsequent calibrations or recalibrations may result in the correction of an image or map of the work field stored in the control unit and/or used by the control unit resulting from the first correction in the initial calibration in a system specific way taking into account the reference marks detected by the optical detector during the subsequent calibration. The use of reference marks generated on the work material allows achieving position precision of 20 µm or less.

Notably, since the optical detector can be integrated within the system, the subsequent calibrations need not rely on the use of external reference plates or measuring equipment. This further allows for an increased degree of automatization since it reduces or even eliminates completely the necessity of human supervision or interaction for manipulating a reference plate or a marking paper and the corresponding measuring equipment.

In preferred embodiments of the invention, the optical detector may comprise an illuminating device configured for illuminating the work field, the work base, the work material and/or at least said part of the one or more reference marks. The illuminating device may be configured for illuminating the one or more reference marks with light in the visible part of the spectrum. The work light may be in a wavelength range between 300 nm and 800 nm, preferably between 400 nm and 700 nm. The illuminating device may comprise one or more LEDs. In some embodiments, the illuminating device may comprise an array of LEDs. The illuminating device may hence be configured for illuminating the one or more reference marks such that the one or more reference marks can be optically detected by the optical detector, even when an interior of the system is dark and/or optically isolated from an exterior of the system. Further, the illuminating device may be configured, additionally or alternatively, for illuminating the work field, the work base, and/or the work material so as to assist an optical detection or measurement by the optical detector.

According to preferred embodiments of the invention, the work base may be movable with respect to the frame structure in a direction perpendicular to the work plane, and the position of the work base with respect to the frame structure may be fixed in two directions parallel to the work plane. This may allow adjusting a distance between the work plane and the optical detector and/or a distance between the work plane and the at least one laser device in the direction perpendicular to the work plane by varying the position of the work base in the aforesaid direction. The movement of the work base with respect to the work frame in said direction perpendicular to the work plane does not negatively affect the precision of the system, since the work base has a fixed position with respect to the frame structure in two directions parallel to the work plane. Depending on whether the work material or another object, such as a calibration plate, is arranged on the work base, the position of the work base can be adjusted such that a distance between the optical detector and the work material, the calibration plate, or the corresponding object, remains constant.

For example, if a layer of work material or a work material unit or object having a thickness W is dispensed on the work base and/or on the work plane, the system may be configured for moving the work base in the aforesaid direction perpendicular to the work plane by a distance W, such that a distance between the uppermost surface of the work material and the optical detector and/or the at least one laser device remains constant. For example, the settings of the optical detector concerning the distance between the optical detector and a surface to be scanned on which the reference marks are located, such as and uppermost surface or layer of the work material, for instance a focus distance, need not be modified or adjusted and can instead remain constant when a new layer or unit of work material is dispensed on the work base and/or on the work plane. This allows suppressing or eliminating a possible source of error and imprecision related to a distance between the optical detector and the work plane.

The work plane may be parallel to the work base. However, other configurations in which the work plane is not parallel to the work base are possible. For example, the work plane may be tilted with respect to the work base by a predefined angle.

In some preferred embodiments of the invention, the optical detector may be movable with respect to the frame structure in one scanning direction, wherein the scanning direction is parallel to the work plane, such that a distance between the optical detector and the work plane and/or the work material in a direction perpendicular to the work plane is fixed. Thus, the position of the optical detector may always be parallel to the work plane and be at a fixed distance from the work plane. This has the advantage that the optical detector may be telecentrically configured with respect to the work plane, i.e. configured to detect light reflected at the work plane irrespectively of a distance between the work plane and the optical detector. Maintaining a constant distance between the optical detector and the work plane is important to avoid focusing errors, which may lead to detection errors, for example to errors in the detection of reference marks and in the processing of the position of the reference marks in the work field. However, the telecentric configuration of the optical detector achieves an improved tolerance with respect to fluctuations in the position and/or orientation of the work plate with respect to the optical detector, i.e. an improved depth of field about the work plane. The optical detector may have a depth of field of at least 500 µm, preferably at least 1000 µm. Since the optical detector detects light reflected at the work base in a direction perpendicular to the work plane, possible errors introduced by deviations in the position and/or orientation of the work plate with respect to the optical detector are not magnified by a relative inclination or a lateral offset of the optical detector with respect to the work plane, on which the reference marks lie.

Again, the concept of "direction" is not limited herein to a particular coordinate system. For a quadrangular work field, for example if a Cartesian coordinate system is used, the scanning direction may be parallel to one of the sides of the quadrangular work field. In a cylindrical coordinate system and for a circular work field, the scanning direction may correspond to an angular or azimuthal direction. Notably, the optical detector may move in the scanning direction forwards or backwards, wherein both movements are referred to herein as movements in the scanning direction.

In preferred embodiments of the invention, the optical detector may extend in a detection direction parallel to the work plane, and the detection direction may preferably be perpendicular to the scanning direction. The optical detector may be configured to detect reference marks throughout at least a part of the extension of the optical detector along the detection direction.

Preferably, the scanning direction corresponds to a direction in which the movement of the optical detector with respect to the frame structure has a degree of freedom, i.e. is movable. Preferably, the detection direction corresponds to a direction in which the movement of the optical detector with respect to the frame structure has no degree of freedom, i.e. is restricted. The work field may hence be scanned by moving the optical detector in the scanning direction while reference marks that are aligned in the detection direction are simultaneously detected for each position of the optical detector along the scanning direction. This allows scanning the work field and detecting the one or more reference marks with a high degree of accuracy and repeatability without necessarily requiring the intervention or supervision of a human operator. The skilled person will appreciate that if the work field has at least two symmetry axis, for example if the work field is a quadrangular work field, the "scanning direction" and the "detection direction" may be exchanged, modifying if necessary a size of the optical detector and/or a length over which the optical detector is movable with respect to the frame structure, such that the work field or the same part thereof can be covered by the optical detector in an equivalent manner (e.g. exchanging the X and Y axes).

For a quadrangular work field, for which the use of a Cartesian coordinate system might be appropriate, the scanning direction may be parallel to a first one of the sides of the quadrangular work field and the detection direction may be parallel to a second one of the sides of the quadrangular work field, wherein the first one and a second one of the sides of the quadrangular work field are mutually perpendicular. For a circular work field, for which the use of cylindrical coordinates might be appropriate, the scanning direction may correspond to an angular or azimuthal direction and the detection direction may correspond to a radial direction, such that the circular work field may be scanned by rotating the optical detector around a central axis of the circular work field, such that the circular work field is swept by the optical detector as it moves around the central axis, wherein the optical detector extends in the radial direction.

According to preferred embodiments of the invention, a length of the optical detector in the detection direction may correspond at least to a length of the work field in the detection direction. Additionally or alternatively, the optical detector may be movable in the scanning direction for a length corresponding at least to a length of the work field in the scanning direction. This may allow completely sweeping the work field with the optical detector by moving the optical detector in the scanning direction throughout the range within which the optical detector is movable in the scanning direction. For example, in the case of a quadrangular work field, a length of the optical detector, i.e. an extension of the optical detector in the detection direction, may correspond to a first lateral size of the quadrangular work field. A length over which the optical detector is movable in the scanning direction may correspond to a second lateral size of the quadrangular work field perpendicular to the first work field, such that the work field may be scanned by moving the optical detector once across the aforesaid second lateral size of the quadrangular work field.

In the case of a circular work field, a length of the optical detector may correspond to a radius or a diameter of the work field and the "length" (or, in this case, "angle") over which the optical is movable may correspond, respectively, to a whole circumference, i.e. an angle of 360°, or to a half circumference, i.e. an angle of 180°. This may allow scanning the work field by moving or rotating the optical detector throughout the distance or angle over which the optical detector is movable.

According to preferred embodiments of the invention, the frame structure may comprise a guiding structure for guiding a movement of the optical detector, wherein the guiding structure preferably comprises at least a guiding rail. The guiding structure guides the movement of the optical detector in directions or dimensions in which the movement of the optical detector with respect to the frame structure has a degree of freedom, i.e. is not restricted. For example, the guiding structure may be configured for guiding the movement of the optical detector in the scanning direction. In some embodiments, the guiding structure may comprise at least a guiding rail extending in the scanning direction. The guiding structure may allow guiding the movement of the optical detector with respect to the frame tractor with a high degree of precision and reproducibility and guaranteeing a restriction of the movement of the optical detector in directions or dimensions in which the movement of the optical detector with respect to the frame structure does not have any degree of freedom, i.e. is restricted.

In some embodiments, for example in embodiments in which the work field has a quadrangular shape, the guiding structure may comprise a first guiding rail extending in the scanning direction along one side of the work field and a second guiding rail extending in the scanning direction along another side of the work field opposite and parallel to the aforesaid one side of the work field, such that the optical detector may be moved in the scanning direction guided by the guiding structure, wherein a first end of the optical detector moves attached to the first guiding rail and a second end of the optical detector moves attached to the second guiding rail.

In other embodiments, for example in embodiments in which the work field has a circular shape, the guiding structure may comprise a guiding rail extending around an outer circumference of the work field, i.e. along a scanning direction corresponding to the angular or a azimuthal direction, such that the optical detector may be moved in the scanning direction guided by the guiding structure, wherein at least a first end of the optical detector moves attached to the guiding rail.

In preferred embodiments of the invention, the system may further comprise a guide control unit for controlling the movement of the optical detector, wherein the guide control unit is configured for moving the optical detector with a scanning speed between 10 and 2000 mm/s, preferably between 100 and 1000 mm/s, more preferably between 200 and 800 mm/s. The guide control unit may allow moving the optical detector across the work field rapidly and with a high degree of accuracy and automatization. The guide control unit may be configured for controlling the movement of the optical detector with a positioning accuracy for the optical detector of 5 μm or less, preferably of 2 μm or less, more preferably of 1 μm or less.

According to preferred embodiments of the invention, the system may further comprise a work material dispenser for dispensing layers of work material on the work base, on the work field and/or on the work material, for example when the laser processing system is an additive manufacturing system. The work material dispenser may be configured for dispensing layers of the work material on the work base or on a previous layer of work material that has already been processed by the at least one laser device, i.e. on a workpiece being formed, such that the dispensed layer of work material can be laser processed by the at least one laser device. Notably, the work material dispenser needs not be configured to dispense work material on the work base only within an extension of the work base. Instead, work material may also be dispensed beyond the work base, i.e. outside of an extension of the work base. In some embodiments, the work material dispenser may use the same guiding structure as the optical detector for moving over the work field dispensing work material on the work base or on a previous layer of work material.

Preferably, the optical detector may be configured to scan the work field before or after a layer of work material is dispensed on the work base and/or on the work material or while a layer of work material is dispensed on the work base and/or on the work material. The system may be configured such that, each time a new layer of work material has been provided on the work base or on a previous layer of work material, the at least one laser device generates the one or more reference marks on the work material and the optical detector scans the work field for detecting the one or more reference marks.

If the optical detector is configured to scan the work field while the work material dispenser is dispensing a layer of work material on the work base or on a previous layer of work material, the system may be configured to control the movement of the optical detector such that the optical detector reaches, i.e. detects, reference marks only after a predefined time has elapsed since the reference marks were generated by the corresponding laser devices, for example after the reference marks have thermally stabilized. This may happen while subsequent reference marks in other parts of the work field have not thermally stabilized yet, are being formed, or are still to be formed. The optical detector and the at least one laser device may be synchronized such that the optical detector does not interfere with the working light emitted by the at least one laser device.

Other configurations are possible in which the at least one laser device generates the one or more reference marks on the work material and the optical detector scans the work field for detecting the one or more reference marks every time a predefined number of layers of work material has been dispensed on the work base and/or on previous layers of work material, for example every two layers or every five layers. Further, other configurations in which the optical detector is moved across the work field for detecting the one or more reference marks more than one time, for instance two times (e.g. once forwards and once backwards), for each newly dispensed layer of work material are also possible.

The system may further be configured such that, while the optical detector is moving, the at least one laser device is not active, i.e. not emitting work light, or is active in such a way that the optical detector does not interfere in the light path of the corresponding work light.

The system may further be configured such that a time between successive measurements of the one or more reference marks by the optical detector is adjustable and/or controllable by the control unit. This may allow adapting a time between measurements to a cooling time required by the work material to thermally stabilize after it has been laser processed by the at least one laser device.

In preferred embodiments of the invention, the system may further comprise an imaging unit connected to the optical detector. The imaging unit may further be operatively connected to the control unit and to the guide control unit of the system. The optical detector may further be configured for scanning the work field before a layer of work material is dispensed on the work base and/or on the work material for making a set of optical measurements of the workpiece, and the imaging unit may further be configured for storing the optical measurements measured by the optical detector for different layers of work material and for generating a virtual image of the one or more workpieces based on the set of optical measurements. Each optical measurement may comprise information about the distribution of work material in each layer of work material. This may allow generating a complete three-dimensional topographic virtual image of the one or more workpieces generated by laser processing the work material layer by layer in the system based on the set of optical measurements. Such a virtual image of the final workpiece or workpieces may be used, for instance, for quality control purposes or for keeping track of previously formed workpieces in order to simplify the formation of replicas thereof, i.e. of subsequent identical workpieces. Scanning the work field for making a set of optical measurements of the workpiece by the optical detector may comprise illuminating the work field by the illuminating device.

In other embodiments, the system may further comprise a work material dispenser for dispensing units or portions of work material on the work base, on the work field and/or on further units or portion of the work material. The work material dispenser may for example correspond to a transportation band configured for dispensing units of work material, for example semiconductor devices, on the work base and/or on the work field by conveying said units of work material through the system for being laser processed in the system by the at least one laser device. The work material dispenser may also correspond to a roll-to-roll system for dispensing a film, sheet or board of work material, for example a paper or plastic board, on the work base and/or on the work field by rolling such as to convey said film, sheet or board of work material through the system for being laser processed in the system by the at least one laser device. In other embodiments, the work material dispenser may also correspond to a robot configured for dispensing units of work material, for example a fuel cell or a microelectronic device, on the work base and/or on the work field for being laser processed in the system by the at least one laser device.

According to preferred embodiments of the invention, the optical detector may have an optical resolution of at least 600 dpi, preferably of at least 1200 dpi, more preferably of at least 2400. The optical detector may be a monochromatic detector. However, the optical detector may also be a colour detector, like an RGB colour detector.

In some preferred embodiments of the invention, the system may further comprise a housing, and the housing may at least partly enclose the work base and at least one of the frame structure, the at least one laser device, and the optical detector. The housing may comprise a thermally and/or electromagnetically insulating material. The housing may be of an opaque material. Thus, the housing may optically, thermally, and/or electromagnetically isolate an interior of the housing, in which the work material is laser processed by the at least one laser device, from an exterior of the housing. This way, the interior of the housing, in which the work field is comprised, can be isolated from an environment by the housing, thereby avoiding interfering interactions of the environment with the interior of the housing so as to maintain the physical conditions such as pressure, temperature, humidity, atmospheric purity, etc. required for additive manufacturing of the one or more workpieces formed in interior of the housing.

However, the housing may allow optical interaction with the interior of the housing from the exterior of the housing, for example through a translucent or transparent portion of the housing. A translucent or transparent portion of the housing may spatially correspond to a projection of the work field so as to allow visual observation and optical observation of the manufacturing process in the interior of the housing and/or optical influence on the interior of the housing from exterior of the housing. Notably, in some embodiments, the frame structure may be integral with the housing, i.e. the frame structure and the housing may be constituted by the same component. In other embodiments, however, the frame structure and the housing may be separate components.

The at least one laser device can be located inside or outside the housing. When located outside the housing, the at least one laser device may be arranged so that they can make optical contact with the work field, for example through a translucent or transparent portion of the housing. Thus, a transparent or translucent part of the housing may also allow work light emitted by the at least one laser device to access the interior of the housing if the at least one laser device is arranged outside the housing.

Preferably, the system may comprise at least one storage chamber for receiving the optical detector, wherein the storage chamber is configured for isolating the optical detector from an exterior of the storage chamber, when the optical detector is within the storage chamber. In some embodiments, the at least one storage chamber may be comprised in the aforesaid housing and/or in the frame structure. Before and/or after detecting the reference marks, i.e. between measurements and/or between scanning movements of the work field, the optical detector may be stored in one of the at least one storage chamber in order to be protected from exposure to deteriorating agents in the interior of the system, for example work material powder, dust, or high temperatures.

In the case of a quadrangular work field, the system may comprise a first storage chamber located at one end of the work field and extending along one of the sides of the quadrangular work field and a second storage chamber located at another end of the work field opposite the aforesaid one end of the work field and extending along another one of the sides of the quadrangular work field opposite the aforesaid one of the sides, such that the optical detector may alterternatingly be stored in one chamber or the other each time the optical detector is moved throughout the work field in the scanning direction, be it forwards or backwards. Preferably, the at least one storage chamber extends in the detection direction and is aligned with the optical detector.

In preferred embodiments of the invention, the system may further comprise a plurality of laser devices. The laser devices may each be configured for simultaneously laser processing the work material within a corresponding laser field. For the system described herein, the plurality of laser devices described in the patent applications DE 10 2017 114 147, EP 189150935.7 and PCT/EP2018/067008 as well as their functionalities may be particularly suitable. However, the present disclosure is not limited thereto and the use of other pluralities of laser devices is also possible. Each laser device may have a corresponding laser field. In preferred embodiments of the invention, the sizes and shapes of the laser fields may be equal. However, in other embodiments of the invention, the sizes and shapes of each of the laser fields may be different.

Each of the laser devices may be configured for generating reference marks within the corresponding laser field. The optical detector may be configured for scanning the work field, thereby detecting at least a part of the reference marks generated by each of the laser devices.

Preferably, at least two of the laser fields of each of the laser devices may cover a common overlapping area. The common overlapping area may cover the entire work field or a part thereof. Thus, the common overlapping area may correspond to the work field, i.e. can be coincident with the work field. This can be the case, for example, if all laser fields cover a square common overlapping area and the work field is a square work field corresponding to the common overlapping area. The common overlapping area of the laser fields of the individual laser devices can comprise the work field without being identical with it. This can be the case, for example, if the laser fields of the individual laser devices cover a square common overlapping area, but the work field is a circular work field having a surface greater than that of the square common overlapping area. In other embodiments, different combinations of laser fields may cover different overlapping areas, and the common overlapping areas may cover the entire work field or a part thereof.

According to preferred embodiments of the invention, the control unit may be configured for calibrating each of the at least one laser device by adjusting one or more of: a focus position of the work light emitted by the laser device, a position of the laser field of the laser device, an orientation of the laser field with respect to the work field, and a size of the laser field.

Adjusting the focus position of the work light emitted by a laser device, the settings of the laser device may be adapted with respect to a distance between the laser device and the work field, such that a focus of the laser device lies within the desired work plane, i.e. such that a focal length of the laser device corresponds to a distance between the laser device and the work field. This may allow adapting the settings of the laser device to compensate a gain drift.

Adjusting the position of the laser field of a laser device may comprise adjusting the position of the laser field with respect to the work field within the work plane and may allow adapting the settings of the laser device to compensate an offset drift. Additionally or alternatively, adjusting the position of the laser field of a laser device may comprise adjusting the position of the laser field in a direction perpendicular to the work plane, such that the laser field be coplanar with the work plane and with the work field. This may allow adapting the settings of the laser device to compensate a gain drift. The position of the laser field of the laser device may be adjusted by modifying a position of a particular point of the laser field, for instance a central point of the laser field.

In some embodiments of the invention, adjusting the position of the laser field of a laser device may further comprise adjusting the position of the laser field in the aforesaid direction perpendicular to the work plane such that the laser field be shifted with respect to an uppermost surface of the work material, a calibration plate, or any other object arranged on the work base by a distance H, wherein H may be between 5 µm and 500 µm, preferably between 10 µm and 200 µm. This may be achieved either by adding an offset to the settings of the at least one laser device regarding the position of the corresponding laser field in the aforesaid direction perpendicular to the work plane and/or by moving the work base downwards by an additional distance H before a calibration of the at least one laser device. For example, the additional distance H may be added to the aforesaid distance W corresponding to the thickness of a layer or unit of work material or to an analogous distance corresponding to the thickness of a calibration plate or the like, for instance in the case of an initial calibration of the system.

As a result of this, the position of the at least one laser field may be shifted with respect to an uppermost surface of the work material in the direction perpendicular to the work plane, such that the at least one laser field may lie a distance H below the uppermost surface of the work material being laser processed. This may contribute to a more efficient and accurate laser processing of the work material by the at least one laser device. Notably, the additional distance H introduces no significant additional detection error for the optical detector, inasmuch as the additional distance H is within a depth of field of the optical detector, and also thanks to the telecentric configuration of the optical detector.

Adjusting the orientation of the laser field with respect to the work field, a desired correspondence or overlapping between the laser field and the work field or a part thereof can be achieved. This means, for example, that the orientation of the work field may be rotated within the work plane in order to choose which part of the work field is covered by the laser field and/or what the orientation of the laser field is with respect to the work field.

The size of the laser field of a laser device may be adapted by setting an effective focal length of the at least one laser device such that a distance between two given points of the laser field equals a distance between two corresponding points of the work field.

In preferred embodiments of the invention, the control unit may be configured for calibrating the at least one laser device with respect to each other by adjusting one or more of: a focus position of the work light emitted by each laser device, a position of each laser field, an orientation of each laser field, and a size of each laser field. The concept of adjusting each of a focus position, a position, and orientation, and a size of the laser fields is analogous to the concepts explained above with respect to the calibration of each of the at least one laser device.

For example, adjusting the positions of each of the laser fields with respect to each other may comprise adjusting the positions of central points of each of the laser fields with respect to each other. Further, by adjusting the focus position of each of laser device, it may be achieved that all laser fields lie coplanar with each other and to the work plane. The orientation of each of the laser fields may be adjusted such that all laser fields have the same orientation.

The control unit may further be configured for analyzing the reference marks detected by the optical detector at subpixel level. The control unit may be configured for analyzing the reference marks detected by the optical detector with a subpixeling rate of at least 1 to 50, preferably at least 1 to 100, i.e. by analising at least 50 subpixel units per detection pixel, preferably at least 100 subpixel units per detection pixel. This allows achieving an improved physical resolution (i.e. a precision in the detection of the position of the reference marks) of 10 µm or less, preferably 5 µm or less, more preferably 2 µm or less, for detection resolutions of the optical detector of at least 600 dpi. Notably, a detection resolution of the optical detector 600 dpi would normally allow for a corresponding physical resolution of around 42 µm. However, the system of the invention allows achieving a detection resolution of 10 µm or less based on the combined function of the optical detector and the control unit.

The control unit may comprise corresponding hardware and/or corresponding software for implementing the calibration explained above.

The invention further refers to a method of calibrating at least one laser device of a laser processing system. The aforesaid system may correspond to any of the embodiments of the invention described above. The method may comprise generating, by each of at least one laser device, one or more reference marks on a work material and/or on a work plane of the system; detecting, by an optical detector, at least a part of the one or more reference marks by scanning a work field of the system with the optical detector, wherein the work field is coplanar with the work plane, wherein the optical detector is integrated in the laser processing system, and wherein the optical detector is movable with respect to the frame structure with not more than two, preferably not more than one, degree of freedom, wherein the optical detector scans the work field by moving across the work field with said not more than two degrees of freedom; and calibrating the at least one laser device based on the one or more reference marks detected by the optical detector.

Since the optical detector is integrated within the laser processing system, the method of the invention allows calibrating the at least one laser device without requiring any intervention by a human operator or any external input or equipment such as marking paper or reference plates. This allows for a high degree of automatization. Further, the restricted mobility of the optical detector with respect to the reference frame provides an increased accuracy. Thus, the method of the invention allows calibrating the at least one laser device with an improved accuracy and with an increased degree of rapidity, automatization and repeatability. Advantageously, the method may be carried out by a client autonomously without requiring support from a service provider.

The one or more reference marks may be generated by the at least one laser device on the work material and/or on the work plane within a corresponding laser field, wherein the laser field corresponds to at least a part of the work field. Each laser field may hence correspond to at least a part of the work field. Each laser field may overlap partly or completely with the work field, i.e. the laser field may cover the entire work field or a part thereof. A total area covered by the at laser fields, i.e. the sum of each of the laser fields, may correspond to the entire work field or to a part thereof. In preferred embodiments of the invention, at least three, preferably at least four, reference marks may be generated by each laser device on the work material and/or on the work plane within the corresponding laser field.

According to preferred embodiments of the invention, the method may further comprise arranging a calibration plate on the work base, such that the calibration plate is coplanar with the work plane. The calibration plate may comprise a substrate and a layer of laser sensitive material arranged on the substrate, wherein the laser sensitive material is sensitive to the work light, such that reference marks may be formed on the calibration plate. Generating the one or more reference marks may comprise generating a plurality of reference marks on said layer of laser sensitive material of the calibration plate, and detecting the one or more reference marks may comprise detecting said plurality of reference marks by the optical detector. The calibration plate may hence be used for an initial calibration of the laser processing system as explained above.

Notably, since the reference marks generated by the at least one laser device are detected by the optical detector, which is integrated within the laser processing system, the method of the invention only requires a reduced time for calibration, as compared to previous solutions known in the prior art based on the use of external measuring equipment, which require interrupting operation for a long time compared to a calibration using the method of the present invention.

The detection of reference marks by an optical detector that has a restricted mobility with respect to the frame structure implies that each position of the work field, for example the measured position of each reference mark, can be reliably detected by the optical detector without relying on the settings of the at least one laser device for detection purposes. Alternatively, the work base itself may be used for providing predefined reference marks, for example in the form of drill holes, marking nuts, gratings, protrusions, incisions, or the like, which may be formed by a manufacturer of the system.

Such an initial calibration may further allow storing initial reference positions of the work field, for instance corresponding to the positions of reference marks generated and detected on a calibration plate or of predefined reference marks provided in the work base, as "ideal" reference positions. Such ideal reference positions may be used later on for calibrating the one or more laser devices by comparing the positions of the detected reference marks to the aforesaid ideal reference positions.

In preferred embodiments of the invention, the method may further comprise illuminating, by an illuminating device, said at least a part of the one or more reference marks, the work field, the work base, and/or the work material.

In some preferred embodiments of the invention, the method may further comprise scanning the work field, by the optical detector, after a layer, portion, or unit of work material is dispensed on the work base or while a layer of work material is dispensed on the work base to detect the reference marks.

In preferred embodiments of the invention, the method may further comprise laser processing, by the at least one laser device, each layer, portion, or unit of work material dispensed on the work base for forming one or more workpieces.

According to preferred embodiments of the invention, the method may further comprise scanning the work field with the optical detector before a layer of work material is dispensed on the work base, making a set of optical measurements of the workpiece by the optical detector, storing the optical measurements measured by the optical detector for different layers of work material by an imaging unit, and generating a virtual image of the one or more workpieces based on the set of optical measurements by the imaging unit.

In preferred embodiments of the invention, calibrating the at least one laser device may comprise adjusting one or more of: a focus position of the work light emitted by the laser device, a position of the laser field, an orientation of the laser field, and a size of the laser field.

Adjusting a focus position of the work light emitted by a laser device may comprise measuring a spot size of a beam of work light emitted by the laser device. During an initial calibration of the laser processing system, the spot size may be measured using a calibration plate. The system may be configured for generating a plurality of test reference marks for different settings of the at least one laser device regarding the focus position of the corresponding work light and for detecting said plurality of test reference marks with the optical detector. The settings corresponding to the thinnest test reference mark, i.e. the test reference mark with the best definition, may then be selected as the correct settings for the focus position. For subsequent calibrations during operation, the spot size may be similarly measured using reference marks generated on the work material Adjusting the position of each of the laser fields may comprise adjusting the positions of the laser fields with respect to the work field and/or with respect to each other within the work plane, such that such that the positions of the laser fields in the work plane with respect to each other correspond to a desired arrangement. For example, in the case of laser fields having quadrangular shapes, adjusting the position of each of the laser fields may comprise adjusting the positions of the laser fields with respect to each other such that the boundaries of neighbouring adjacent laser fields match each other, i.e. overlap each other in any or both of the two directions parallel to the work plane.

Additionally or alternatively, adjusting the position of the laser fields may comprise adjusting the position of each of the laser fields with respect to the work plane and/or with respect to each other in a direction perpendicular to the work plane, such that all laser fields be coplanar with the work plane and to the work field and the work plane.

The position, orientation, and/or size of a laser field may be adjusted by generating a reticular pattern of reference marks with the corresponding laser device. During an initial calibration of the laser processing system, the reticular pattern may be generated on a calibration plate as described above. For subsequent calibrations during operation, the reticular pattern may be generated on the work material and/or on the work field. For example, a reticular square pattern of evenly spaced 9×9 reference marks may be generated by the laser device. However, any larger number of reference marks, for example a reticular pattern of 33×33 or 255×255 reference marks may also be used. The position, orientation, and grid parameter of the generated pattern may then be measured by the optical detector based on stored ideal reference positions for adjusting the position, orientation and size of the corresponding laser field. The system may be configured for generating a smaller number of reference marks for a subsequent calibration than for an initial calibration. For example, for a subsequent calibration, each laser device may be configured to generate not more than nine, preferably not more than four, reference marks, which may be preferably located on the boundary of the corresponding laser field.

In some preferred embodiments of the invention, calibrating the at least one laser device may comprise calibrating the one or more laser devices with respect to each other by adjusting one or more of: a focus position of the work light emitted by each laser device, a position of each laser field, an orientation of each laser field, and a size of each laser field.

Adjusting a focus position of the work light emitted by each laser device may comprise measuring a spot size of the work light emitted by each laser device as explained above for a single laser device by means of a marking paper or of the work material. Adjusting the position, orientation, and size of each of the laser fields may comprise generating a reticular pattern of reference marks with each laser device as explained above and comparing the position, orientation, and grid parameters of each of the reticular patterns to teach other and/or to stored ideal reference positions.

Notably, calibrating the at least one laser device may comprise any or both of: 1. adjusting one or more of: a focus position of the work light emitted by the laser device, a position of the laser field, an orientation of the laser field, and a size of the laser field; and 2. calibrating the one or more laser devices with respect to each other by adjusting one or more of: a focus position of the work light emitted by each laser device, a position of each laser field, an orientation of each laser field, and a size of each laser field.

According to preferred embodiments of the invention, the laser processing system may be an additive manufacturing system for laser processing the work material for forming one or more workpieces. However, in other preferred embodiments of the invention, the laser processing system may be any of a laser processing system for plastic web scribing, perforation and/or cutting, for instance for the production of plastic packaging; a laser processing system for paper board "roll to roll" cutting applications or paper board sheet cutting applications, for instance for the production of packagings; a laser processing system of a digital printer; a laser processing system for precise laser micromachining, for example for cutting, ablating, etching, structuring and/or welding; a laser processing system for laser marking; a laser processing system for photovoltaic processes, for example PERC (Passivated Emitter and Rear Cell)-technology-based processes; a laser processing system for wafer production; a laser processing system for laser processes on glassware and displays, like OLEDs; a laser processing system for ITO- and/or LDS structuring applications; a laser processing system for high-power high-precision welding, for example for fuel cell welding. However, it will be clear to the skilled person that the present invention is also applicable to further processing systems, other than those previously mentioned.

BRIEF DESCRIPTION OF THE FIGURES

FIG. 1 shows side views of an additive manufacturing system according to an embodiment of the invention. FIGS. 1a and 1b show the same system before and after a layer of work material has been dispensed on the work base.

FIG. 4 shows an additive manufacturing system according to another embodiment of the invention. FIGS. 4a and 4b show, respectively, a side view and a top view of the system.

Figure 2:
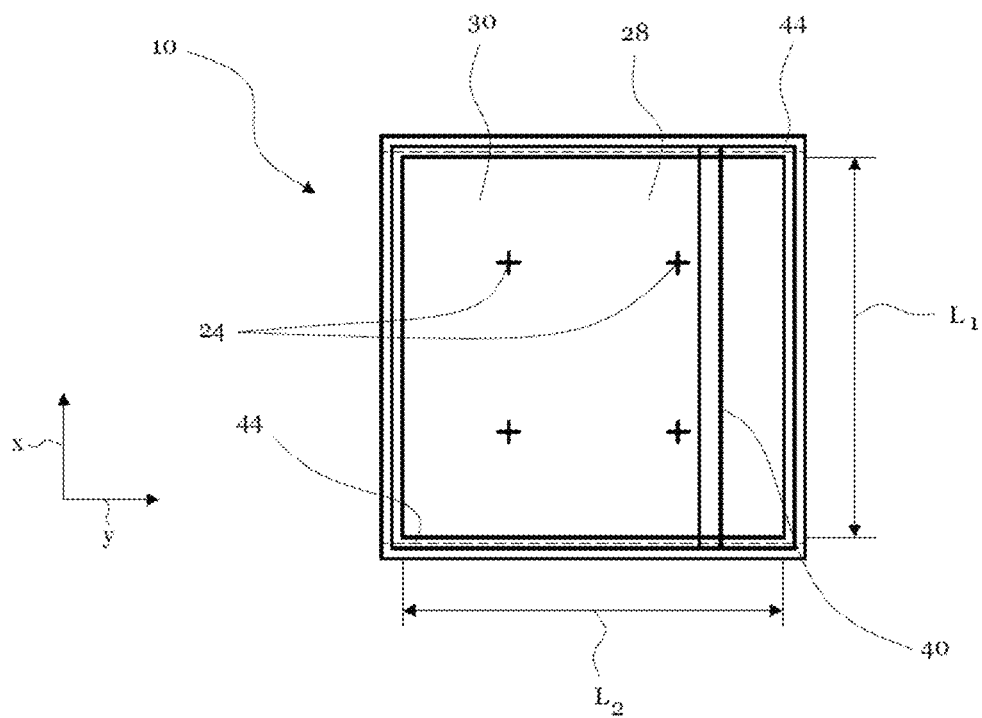
FIG. 2 shows a top view of the system of FIG. 1.

DESCRIPTION OF PREFERRED
EMBODIMENTS OF THE INVENTION

For the purposes of promoting an understanding of the principles of the invention, reference will now be made to preferred embodiments illustrated in the drawings, and specific language will be used to describe the same. It will nevertheless be understood that no limitation of the scope of the invention is thereby intended, and that such alterations and further modifications of the illustrated embodiments as well as further applications of the principles of the invention illustrated herein are contemplated as would normally occur now or in the future to one skilled in the art to which the invention relates.

FIG. 1 shows a laser processing system according to an embodiment of the invention. The laser processing system of the embodiment shown in FIG. 1 is an additive manufacturing system 10. The system 10 comprises a frame structure 12 and a work base 14 that is configured for supporting a work material. In the embodiment shown, the frame structure 12 is formed as a housing that encloses the work base 14 and defines a work volume within which one or more workpieces may be laser processed.

The work base 14 has a quadrangular shape defines a quadrangular work field on a work plane 18, wherein the work plane 18 is parallel to the work base 14. As shown in FIG. 1a, when no work material is arranged on the work base 14, the work plane 18 is coplanar with an uppermost surface of the work base 14. The system may comprise a work material dispenser (not shown in the figure) configured for dispensing layers of work material at least on the work base 14, be it directly on the work base 14 or on a previous layer of work material supported by the work base 14, although work material may also be dispensed beyond the work base.

The system 10 further comprises a laser device 20 that is configured for projecting work light on the work plane 18. In the embodiment shown, the work light is in a wavelength range between 9 μm and 11 μm. The embodiment shown in FIG. 1 only comprises one laser device 20, similar embodiments may comprise more than one laser device. The laser device 20 is attached to the frame structure 12 and is configured for laser processing the work material 16 with work light within a laser field of the laser device 20 for generating a workpiece out of the work material 16. In the embodiment shown, the laser field of the laser device 20 covers the entire work field of the system 10.

In the embodiment shown in FIG. 1, the laser device 20 is rigidly attached to the frame structure 12, such that if the frame structure undergoes thermally driven deformations, the laser device 20 is exposed to the same geometry variations as the frame structure 12. The frame structure 12 comprises a transparent part 13 that allows the laser device 20 to interact optically with an interior of the work volume, i.e. with an interior of the frame structure 12, such that the work light emitted by the laser device 20 can reach the work plane 18.

The work base 14 is movable with respect to the frame structure 12 in a direction perpendicular to the work plane 18, i.e. in the z direction as shown in the figure, whereas a position of the work base 14 with respect to the frame structure 12 is fixed in the two directions parallel to the work plane, namely in the x direction and in a y direction that is not shown in the figure and that is perpendicular to the plane of the paper sheet.

FIG. 1b shows the same system shown in FIG. 1a, wherein a layer of work material 16 has been arranged on the work base 14. The system 10 is configured such that, when a layer of work material 16 having a thickness W is arranged on the work base 14, the work base 14 can be moved downwards in the aforesaid direction perpendicular to the work plane 18, i.e. in the z direction, by a distance W corresponding to the thickness of the layer of work material 16, such that an uppermost surface of the work material 16 is coplanar with the work field 18. Thus, the position of the work plane 18 in the z direction is kept constant with respect to the system 10, in particular with respect to the laser device 20, by correspondingly adjusting the position of the work base 14 in the z direction.

The laser device 20 is configured for generating a plurality of reference marks 24 on the work plane. FIG. 2, which may be considered in combination with FIG. 1, shows a top sectional to view of the system 10 shown in FIG. 1, in which elements overlying the work base 14, such as an upper part of the frame structure 12 are omitted for illustrative purposes, such that the work field 28 of the system 10, the laser field 30 of the laser device 20, and the reference marks 24 generated by the laser device 20 are visible. In the embodiment shown, the reference marks 24 are cross-shaped. However, in other embodiments, the reference marks 24 may have a different shape.

When no work material is arranged on the work base 14, corresponding to the situation shown in FIG. 1a, the reference marks 24 generated by the laser device 20 on the work plane 18 are coplanar with an uppermost surface of the work base 14 or of an object arranged on the work base 14 (cf. calibration plate 36 described below with respect to FIG. 3). When a layer of work material 16 is arranged on the work base 14, corresponding to the situation shown in FIG. 1b, the reference marks 24 generated by the laser device 20 on the work plane 18 are generated on the work material 16 and are hence coplanar with an uppermost layer of the work material 16.

The system 10 further comprises an optical detector 40 for scanning the work field 28 for detecting at least a part of the reference marks 24 generated by the laser device 20. In the embodiment shown, the optical detector 40 is movable with respect to the frame structure 12 with only one degree of freedom corresponding to a scanning direction that is parallel to the y direction shown in FIG. 2. The scanning direction is hence perpendicular to the directions x and z shown in FIG. 1. Thus, the optical detector is movable in one direction parallel to the work plane 18 (the y direction) and fixed in another direction parallel to the work plane 18 (the x direction) and in a direction perpendicular to the work plane (the z direction). The directions x, y, and z correspond to the three mutually perpendicular directions of a Cartesian coordinate system that may be used to describe the geometry of the system 10.

The optical detector 40 comprises an illuminating device 42 configured for illuminating the work field 28, the work base 14, the work material 16 and/or the reference marks 24 generated by the laser device 50. The illuminating device 42 comprises, in the embodiment shown, an LED array configured for generating white visible light. In other embodiments, other types of light source and/or visible light of other colors may be used.

Since the optical detector 40 has no degree of freedom in the z direction perpendicular to the work plane 18, a distance D between the optical detector 40 and the work plane 18 is constant. As shown in FIG. 1a, when no work material is arranged on the work base 14, the distance D corresponds to a distance between the optical detector 40 and the work base 14 or to a distance between the optical detector 40 and an object arranged on the work base 14 (cf. calibration plate 36 described below with respect to FIG. 3). As shown in FIG. 1b, when work material 16 is arranged on the work base 14, the distance D corresponds to a distance between the optical detector 40 and an uppermost layer of the work material 16.

The optical detector 40 is configured for scanning the work field 28 for detecting the reference marks 24 by moving in the y direction both from left to right or from right to left (cf. FIG. 2). The y direction hence corresponds to a scanning direction swept by the optical detector 40 when scanning the work field 28.

The optical detector 40 of the embodiment shown in FIG. 1 extends in the x direction parallel to the work plane 18. The x direction hence corresponds to a detection direction along which reference marks 24 may be simultaneously detected by the optical detector 40 as the optical detector 40 scans the work field 28. As shown in FIG. 2, a length of the optical detector in the detection direction x is slightly larger than a length $L_1$ of the work field 28 in the detection direction x. Further, the optical detector 40 is movable in the scanning direction y for a length that corresponds to a length $L_2$ of the work field 28 in the scanning direction y. Thus, the optical detector 40 can scan the entire work field 28 by sweeping the work field 28 once, i.e. by moving once through the work field 28 in the scanning direction y.

The frame structure 12 further comprises a guiding structure 44 for guiding the movement of the optical detector 40 in the scanning direction. The guiding structure 44 comprises two parallel guiding rails that extend in the scanning direction y on opposite sides of the work field 28. In the embodiment shown, the guiding structure 44 is formed on lateral walls of the frame structure 12. However, in other similar embodiments, the guiding structure 44 may be differently formed. For example, in the embodiment shown in FIG. 3, the guiding structure 44 is formed on a base or bottom part of the frame structure 12.

In the embodiment shown, the optical detector 40 is a monochromatic detector and is configured to scan the work field 28 every time a layer of work material 16 is dispensed on the work base 14 and has an optical resolution of 600 dpi. The optical detector 40 has a depth of field of 500 μm.

The system 10 shown in FIGS. 1 and 2 further comprises a control unit 50 that is functionally connected to the optical detector 40 and to the laser device 20. In the embodiment shown, the control unit 50 is arranged on the laser device 20. However, the control unit 50 needs not be physically attached to the laser device 20, to the frame structure 12, or to any other component of the system 10. The control unit 50 is configured for calibrating the laser device 20 based on the reference marks 24 detected by the optical detector 40.

The control unit 50 is configured for calibrating the laser device 20 by adjusting a focus position of the work light emitted by the laser device 20 as well as a position, a size, and an orientation of the laser field 30 of the laser device 20. The control unit 50 can control the settings of the laser device 20 such that a focal length of the work light emitted by the laser device 20 corresponds to a distance between the laser device 20 and the work plane 18, i.e. such that the focus position of the work light emitted by the laser device 20 lies on the work plane 18. In other words, the control unit 50 can control the settings of the laser device 20 such that a position of the laser field 30 in the z direction perpendicular to the work plane 18 corresponds to the position of work plane 18, i.e. such that the laser field 30 of the laser device 20 be coplanar with the work field 28.

In the embodiment shown, the control unit 50 can further be configured to control the settings of the laser device 20 such that a focal length of the work light emitted by the laser device 20 corresponds to a distance between the laser device 20 and the work plane 18 plus an additional distance of 100 μm, such that the focus position of the work light emitted by the laser device 20 lies 100 μm below the work plane, i.e. such that the laser field 30 lies 100 μm below the uppermost surface of the work material 16.

The control unit 50 can further control the settings of the laser device 20 such that a position of the central point of the laser field 30 in the x and y directions coincides with a position of the central point of the work field 28 in the x and y directions or to any other position of the work field 28. Further, the control unit 50 can control the settings of the laser device 20 such that the orientation of the work field 28 coincides with the orientation of the laser field 30, i.e. such that the sides of the quadrangular work field 28 are parallel and/or tangent to the sides of the quadrangular laser field 30, or to any other orientation.

The system 10 further comprises a guide control unit 52 for controlling the movement of the optical detector 40 that is configured for moving the optical detector 40 in the scanning direction y with a scanning speed of 500 mm/s. Like the control unit 50, the guide control unit 52 needs not be physically attached to the laser device 20, the frame structure 12, or any other component of the system 10 as shown in the figure.

Figure 3:
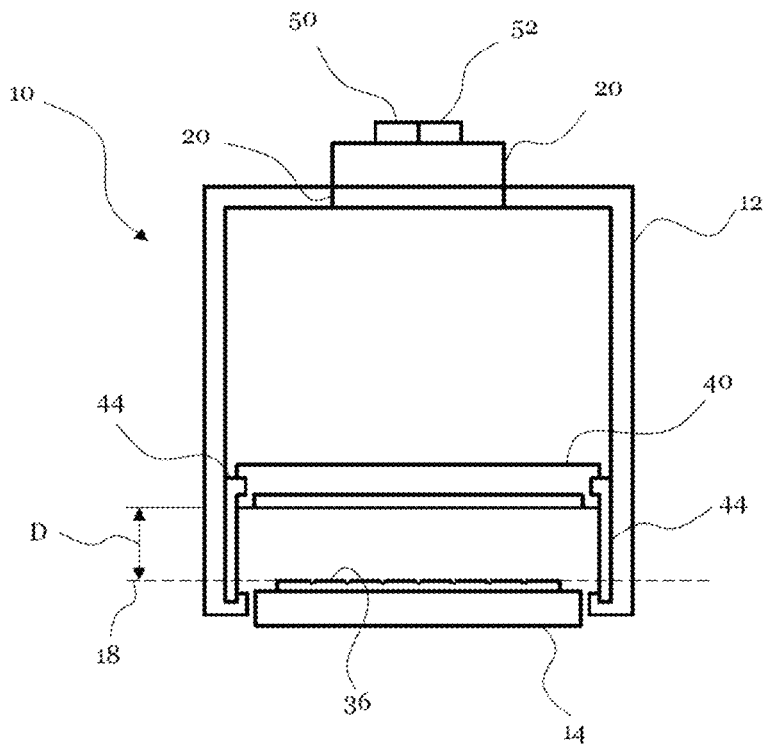
FIG. 3 shows a side view of an additive manufacturing system according to another embodiment of the invention.

FIG. 3 shows an additive manufacturing system 10 according to another embodiment of the invention that is very similar in construction to the system 10 shown in FIGS. 1 and 2. The components of the system 10 of FIG. 3 that have already been described with respect to FIGS. 1 and 2 are indicated by the same reference signs and are not described again on behalf of brevity. As already pointed out before, the system 10 shown in FIG. 3 differs from the system 10 shown in FIGS. 1 to 2 in that the guiding structure 44 is not formed on lateral walls of the frame structure 12 but on the bottom of the frame structure 12.

FIG. 3 further shows a calibration plate 36 that is arranged on the work base 14. The calibration plate comprises a glass substrate and a layer of a laser sensitive material arranged on the substrate. The layer of laser sensitive material is a multilayer structure that comprises a first layer of black laser sensitive material and an underlying second layer of a white material. The calibration plate 36 allows forming reference marks by removing the first layer of black laser sensitive material with work light by the laser device 20, thereby exposing the underlying second layer. The contrast between the exposed white underlying second layer and the black first layer of laser sensitive material allows for the formation of reference marks 24 with very high definition, which may be detected by the optical detector 40 with high-resolution. The use of the calibration plate 36 will be explained in further detail below.

FIG. 4 shows an additive manufacturing system 10 according to another embodiment of the invention. FIG. 4a shows a side view of the system 10, while FIG. 4b shows a top view The components of the system 10 of FIG. 4 that have already been described with respect to foregoing figures are indicated by the same reference signs and are not described again on behalf of brevity. A remarkable difference between the system 10 shown in FIG. 4 and the systems shown in FIGS. 1 to 3 is that in the system shown in FIG. 4, the work base 14 has a circular shape and defines a circular work field 28. Therefore, it is appropriate to describe the geometry of the system 10 of FIG. 4 using a cylindrical system of coordinates with respect to the same perpendicular direction z used to describe the system shown in FIGS. 1 to 3, to a radial direction r, and to an angular or azimuthal direction φ, are indicated by arrows in the figure.

In the embodiment shown in FIG. 4, the optical detector 40 extends in the radial direction r for a length corresponding to the radius of the circular work field 28. The optical detector 40 is movable with respect to the frame structure 12 with one degree of freedom that corresponds to the angular direction φ. The frame structure 12 comprises a guiding structure 44 that extends in the angular direction φ all along the outer circumference of the circular work field 28. The system 10 is configured such that the optical detector 40 can scan the work field 28 by moving in the angular direction φ, i.e. by rotating around the central axis of the circular work field 28. The optical detector 40 can scan the entire work field 28 by rotating once, i.e. by an angle of 360°, around the central axis of the circular work field 28.

A further difference between the system 10 shown in FIG. 4 and the systems shown in FIGS. 1 to 3 is that, in the system 10 shown in FIG. 4, the frame structure 12 is not formed as a housing but as a rack that supports the laser device 20 the control unit 50, the guiding structure 44 and the optical detector 40. The system 10 of FIG. 4 comprises a separate housing 60 that encloses the work base 14, the frame structure 12, the laser device 20 and the optical detector 40.

In the embodiment shown, the housing 60 has a circular shape and is concentric with the frame structure 12 and the work field 28. However, in other embodiments, the housing 60 may have a shape different than that of the circular work field 28, for example a quadrangular shape. The laser device 20 of the system 10 shown in FIG. 4 generates reference marks within a circular laser field that coincides with the work field 28. However, in other embodiments, the laser device 20 can be configured to generate reference marks within a quadrangular laser field that comprises the circular work field 28 and covers a larger surface than the circular work field 28, such that some of the reference marks generated by the laser device 20 can be within the laser field 30 without being within the circular work field 28.

Figure 5:
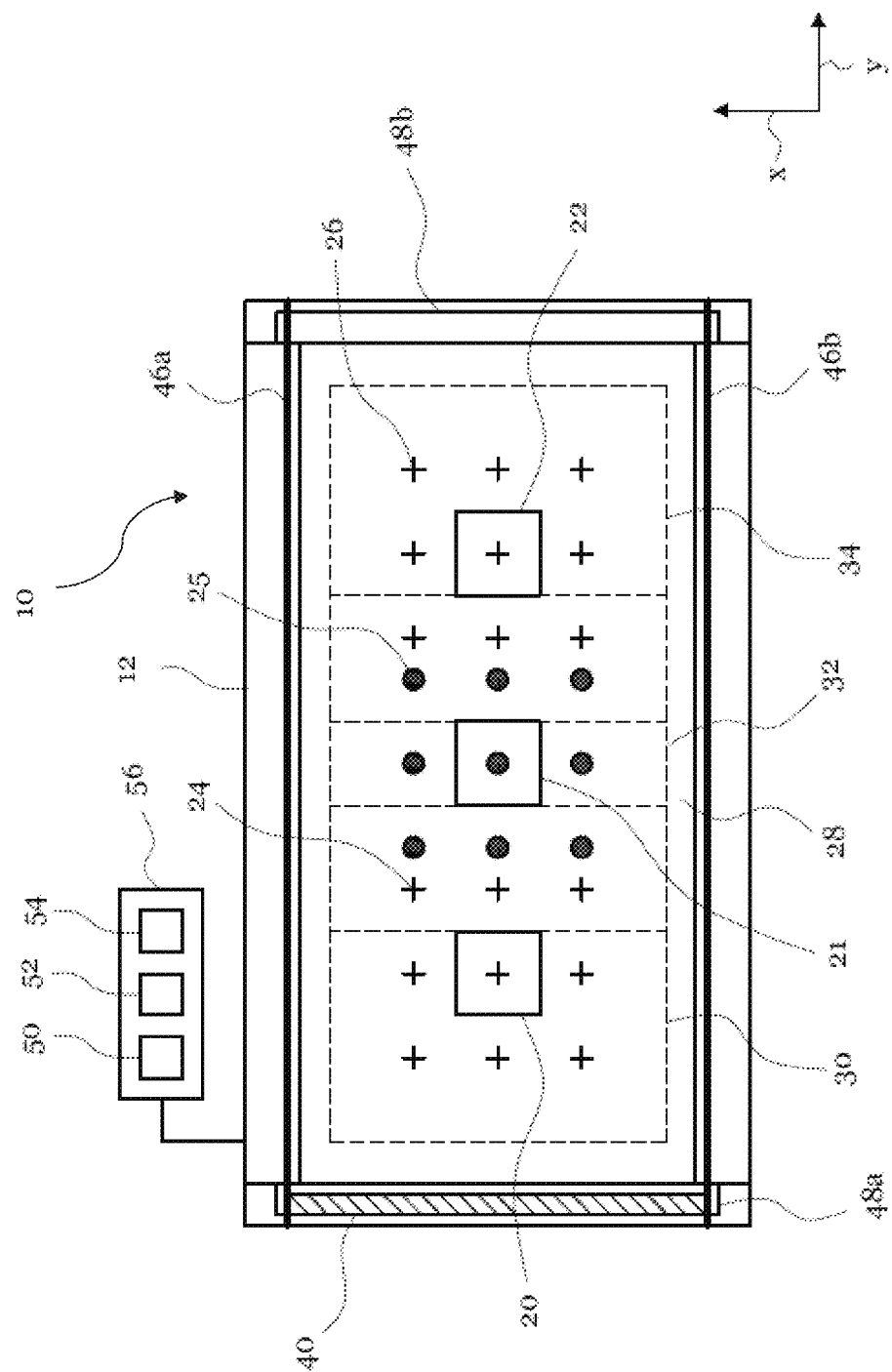
FIG. 5 shows a top view of an additive manufacturing system according to another embodiment of the invention.

FIG. 5 shows a top view of a laser processing system 10 according to embodiments of the present invention. The laser processing system 10 shown in of FIG. 5 may correspond to an additive manufacturing system according to embodiments of the present invention, in which case, a side view of the system shown in FIG. 5 could correspond to one of the side views shown in FIGS. 1 and 3. In FIG. 5, an upper part of the frame structure 12 is omitted for illustrative purposes, although the laser devices, which are arranged on the frame structure 12, are shown.

However, the laser processing system shown in FIG. 5 may also correspond to any of the types of laser processing systems mentioned above, for example a laser processing system for paper board "roll to roll" cutting applications or for semiconductor wafer production. In this case, the laser processing system 10 may be a station or component of a production chain, in which a paper board or a wafer is laser processed. For example, the frame structure 12 of the laser processing system 10 may have openings for allowing a paper board film to be rolled through the work field 28, preferably in the x direction or in the y direction, such that different parts of the paper board film can be laser processed in the laser processing system 10. In other examples, the frame structure 12 of the laser processing system 10 may have openings for allowing a transportation band to be conveyed through the work field 28, preferably in the x direction or in the y direction, such that objects lying on the transportation band, for example wafers, can be continuously or sequentially conveyed through the work field and laser processed in the laser processing system.

The adaptation of the presently disclosed invention to other types of laser processing system, for instance a laser processing system for any of plastic web scribing, perforation and/or cutting, for a digital printer, for precise laser micro-machining, for laser marking, for photovoltaic processes, for wafer production for laser processes on glassware and displays, a for ITO- and/or LDS structuring applications, or for high-power high-precision welding. The corresponding adaptations of a production plant, chain, or system, in which a laser manufacturing system according to the invention is integrated, are well accessible to the skilled person.

The system 10 of FIG. 5 comprises a plurality of laser devices 20, 21, and 22. Notably, although three laser devices are represented in the figure, the system may also comprise a different number of laser devices. The laser devices 20, 21, and 22 are configured for simultaneously laser processing a layer of work material 16 arranged on the work base 14 within a corresponding laser field. The work base of the system 10 of FIG. 5, which is not shown in the figure, has a rectangular shape and defines a rectangular work field 28. The laser devices 20, 21, and 22 are respectively configured for simultaneously laser processing the work material 16 within a corresponding laser field 30, 32, and 34. The laser fields 30, 32, 34 have square shapes and overlap pairwise, such that the laser fields 30 and 32 and the laser fields 32 and 34, have common overlapping areas that cover a part of the work field 28. The system 10 of FIG. 5 may be configured for generating a single workpiece out of the work material by means of the combined action of the three laser devices 20, 21, and 22 or may be configured for generating three independent workpieces out of the work material by means of parallel actions of the three laser devices 20, 21, and 22.

The optical detector 40 extends in the detection direction x for a length slightly larger than a length of the work field 28 in the detection direction x and is movable with respect to the frame structure 12 with only one degree of freedom that corresponds to the scanning direction y. The optical detector 40 is movable in the scanning direction y for a length that is larger than the length of the work field in the scanning direction y, such that the optical detector 40 can scan the entire work field 28 by moving across the work field 28 once in the scanning direction y, be it from left to right or from right to left as seen in the figure.

The movement of the optical detector 40 in the scanning direction y is guided by a first guiding rail 46a and a second guiding rail 46b that extend in the scanning direction y on opposite sides of the work field 28 and are parallel to each other. The optical detector 40 can hence be moved in the scanning direction y guided by the guiding rails 46a and 46b, wherein a first end of the optical detector moves attached to the first guiding rail 46a and a second end of the optical detector 40 moves attached to the second guiding rail 46b.

Each of the laser devices 20, 21, and 22 is configured for generating corresponding reference marks 24, 25, and 26 within the corresponding one of the laser fields 30, 32, 34. The optical detector 40 is configured to scan the work field 28 and detect at least a part of the reference marks 24, 25, 26 generated, respectively, by each of the laser devices 20, 21, 22.

The system 10 shown in FIG. 5 further comprises a first storage chamber 48a and a second storage chamber 48b that are configured for receiving the optical detector 40 and for isolating the optical detector 40 from an exterior of the corresponding storage chamber, when the optical detector 40 is stored within the storage chamber. In the embodiment shown, the first and second storage chambers 48a and 48b are formed in the frame structure 12. The guiding rails 46a and 46b extend into the first and second storage chambers 48a and 48b.

The system 10 is configured for storing the optical detector 40 in one of the storage chambers 48a and 48b during the times in which work material is being dispensed on the work base 14 for protecting the optical detector 40. For example, starting out from the situation illustrated in FIG. 5, the optical detector 40 may scan the work field 28 by moving in the scanning direction y from left to right, i.e. from the first storage chamber 48a towards the second storage chamber 48b, thereby detecting the reference marks 24, 25, and 26 generated by each of the laser devices 20, 21, 22 and then enter the second storage chamber 48b and remain there until a new layer of work material has been dispensed on the work base 14 and new reference marks must hence be detected.

Then, the optical detector 40 scans the work field 28 by moving in the scanning direction y from right to left and enters again the first storage chamber 48a, and so forth.

The system 10 of FIG. 5 further comprises a control unit that is functionally connected to the optical detector 40 and to each of the laser devices 20, 21, and 22. The control unit 50 is configured for calibrating each of the laser devices 20, 21, 22 based on the reference marks 24, 25, and 26 detected by the optical detector.

Notably, the reference marks 24, 25, and 26 are only exemplary. Different numbers of reference marks may be used and the reference marks may be arranged differently. For example, during an initial calibration of the system, each of the laser devices 20, 21, 22 may be configured to generate a reticular pattern of reference marks comprising as many as 255×255 reference marks. For a subsequent calibration, each of the laser devices 20, 21, 22 may be configured to generate a reticular pattern of reference marks comprising a reduced number of reference marks, for example 4 reference marks, which may be located on the boundaries of the corresponding laser field, preferably on the corners of the respective laser field 30, 32 or 34. The reference marks 24, 25, 26 that exemplary shown in FIG. 5 arranging the form of 3×3 reticular patterns.

The control unit 50 of the system 10 shown in FIG. 5 is configured to calibrate each of the laser devices 20, 21, and 22 by adjusting a focus position of the work light emitted by the corresponding laser device as well as a position, size and orientation of the corresponding laser field as explained above for the system illustrated in FIGS. 1 and 2. The control unit 50 is configured to calibrate the laser devices 20, 21, 22 based on the reference marks 24, 25, 26 detected by the optical detector 40.

The control unit 50 is configured to calibrate the laser devices 20, 21, and 22 with respect to each other by adjusting the focus positions of the work light emitted by each laser device 20, 21, and 22 as well as the position, orientation, and size of each of the laser fields 30, 32 and 34 with respect to each other. This comprises adjusting the positions of each of the laser fields 30, 32, and 34, such that all laser fields are coplanar with each other and with the work field 28, and such that the effective focal length of each of the laser devices 20, 21 and 22 is such that the work light emitted by each of the laser devices 20, 21, 22 is focused on the work field 28. Further, the control unit 50 can control the settings of the laser devices 20, 21, 22 such that the positions, orientations, and sizes of each of the laser fields 30, 32, and 34 on the work plane 28 coincide with each other, such that the sides of the laser fields 30, 32, 34 are parallel to each other as shown in FIG. 5.

The system 10 shown in FIG. 5 further comprises an imaging unit 54 that is operatively connected to the optical detector 40. The optical detector 40 is configured for scanning the work field 28 each time a layer of work material is going to be dispensed on the work base 14, before the new layer of work material is dispensed, for making a set of optical measurements of the workpiece or the workpieces being generated in the system. Each optical measurement comprises information about the distribution of work material 16 in a corresponding layer of work material 16 that has already been laser processed by the laser devices 20, 21, 22. The imaging unit 54 is configured for storing the optical measurements measured by the optical detector 40 for different layers of work material 16 and for generating a virtual image of the workpiece or the workpieces based on the set of optical measurements.

In the embodiment shown in FIG. 5, the control unit 50, the guide control unit 52, and the imaging unit 54 are not integrated within or attached to the frame structure 12. Instead, the control unit 50, the guide control unit 52, and the imaging unit 54 are comprised in an integrated control 56 that is independent of the frame structure 12 and the remaining components of the system 10.

Figure 6:
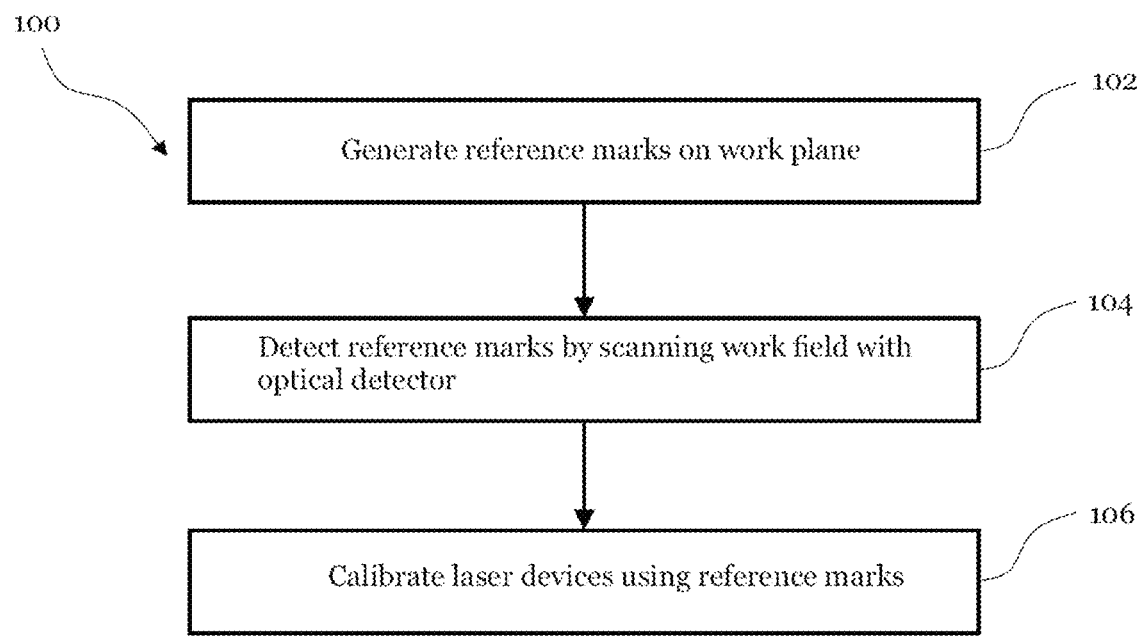
FIG. 6 shows a flow diagram representing a method according to an embodiment of the invention.

FIG. 6 shows a flow diagram that represents a method 100 of calibrating one or more laser devices of a laser processing system according to an embodiment of the invention. The aforesaid laser processing system can correspond to the additive manufacturing system 10 described with respect to any of FIGS. 1 to 4 or to a laser processing system 10 like the one described with respect to FIG. 5, which may correspond to any of the types of laser processing systems mentioned above. The method 100 may be a method of calibrating the one or more laser devices 20, 21, 22 of an additive manufacturing system like the system 10 shown in any of FIGS. 1 to 4, or of any laser processing system in general, like a laser processing system corresponding to the embodiment shown in FIG. 5.

In a first method step 102, one or more reference marks 24 are generated by at least one laser device 20, 21, 22 of the system 10 on the work plane 18 of the system. This may imply generating the one or more reference marks 24, 25, 26 on the work material 16, when work material is arranged on the work base 14, as shown, for example, in FIG. 1b, or generating the one or more reference marks 24 on a calibrating plate 36, when a calibrating plate 36, or any other object, is arranged on the work base 14, as shown in FIG. 3.

In a subsequent method step 104, the optical detector 40 of the system 10 scans the work field 28, thereby detecting at least a part of the one or more reference marks 24, 25, 26. The optical detector 40 is integrated in the laser processing system. The method step 104 may comprise illuminating the reference marks 24, 25, 26 detected by the optical detector 40, the work field 28, the work base 14, and/or the work material 16 by an illuminating device 42.

In a subsequent method step 106, the at least one laser device 20 is calibrated based on the reference marks 24, 25, 26 detected by the optical detector 40. The calibration may be carried out as explained above according to embodiments of the present invention and/or according to calibration methods that are accessible to the skilled person. At least three, preferably at least four reference marks 24, 25, 26 may be generated by each of the at least one laser device 20.

The method 100 illustrated in FIG. 6 may correspond to an initial calibration or to a subsequent calibration of the system as explained above. For example, the method 100 represented in FIG. 6 may be carried out before or after a layer of work material 16 has been dispensed on the work base 14 of the system 10 of one of FIGS. 1 to 5. Embodiments of the invention are also possible in which the method 100 is carried out while a layer of work material 16 is being dispensed on the work base 14. The method steps 102 to 106 of the method 100 may be cyclically repeated. The method 100 represented in FIG. 6 may also be carried out as an initial calibration for any laser processing system in general, like a laser processing system corresponding to the embodiment shown in FIG. 5, for example before a new work material unit or part, such as a portion of a paper board or a semiconductor wafer, has been arranged on the work base in a laser processing system 10.

Figure 7:
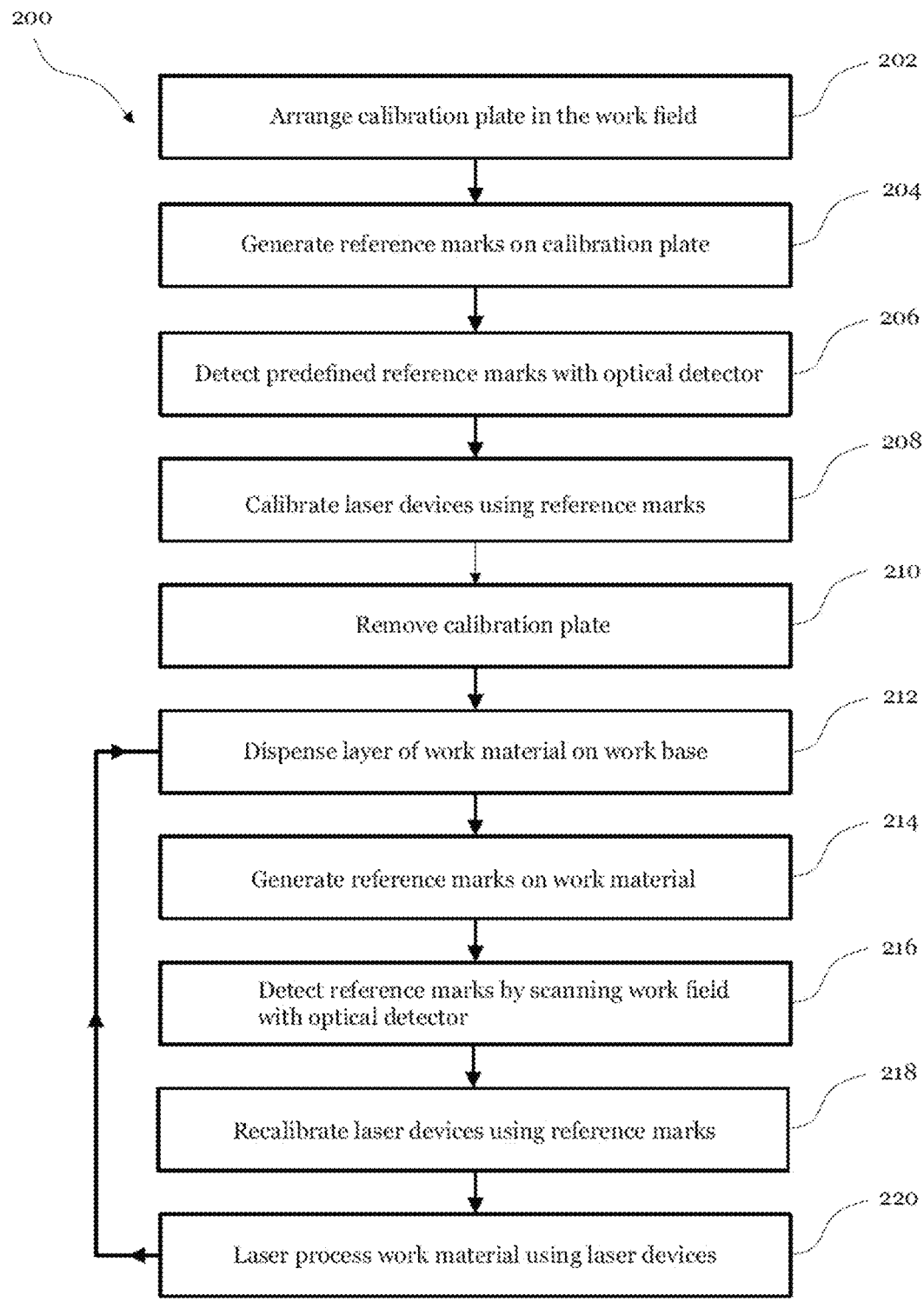
FIG. 7 shows a flow diagram representing a method according to another embodiment of the invention.

FIG. 7 shows a flow diagram illustrating a method 200 of calibrating one or more laser devices of a laser processing system according to another embodiment of the invention. The method 200 represented in FIG. 7 may be better understood by referring to the additive manufacturing system 10 shown in FIG. 3 described above, since the method 200 may be a method of calibrating the one or more laser devices 20 of an additive manufacturing system like the system 10 shown in FIG. 3.

The method 200 comprises a step 202 of arranging a calibration plate 36 on the work base 14 such that the calibration plate 36 is coplanar with the work plane 18 within a tolerance corresponding to the depth of field of the optical detector 40. In the embodiment shown, when the calibration plate 36 is arranged on the work base 14, the work base is moved down by a distance corresponding to the sum of a thickness of the calibration plate plus an additional distance H of 100 μm.

The calibration plate 36 corresponds to the calibration plate 36 previously described with to respect to FIG. 3 and comprises a substrate and a layer of laser sensitive material arranged on the substrate, wherein the laser sensitive material is sensitive to the work light, such that reference marks may be formed on the calibration plate 36.

In a subsequent method step 204, a plurality of reference marks 24 is generated on the calibration plate 36.

In a subsequent method step 206, the plurality of reference marks generated on the reference plate 36 is detected by the optical detector 40 of the system 10.

In a subsequent method step 208, the one or more laser devices 20 are calibrated as explained above based on the plurality of reference marks 24 detected by the optical detector 40. The reference marks 24 generated on the reference plate 36 have a very good definition and allow for a highly accurate calibration. As a consequence of the additional distance H of 100 μm, after the calibration, the laser fields (cf. laser fields 30, 32 or 34 in FIGS. 1 to 5) of the one or more laser devices 20 are parallel to the work plane and lie below the work plane shifted with respect to the work plane 28 by the additional distance H of 100 μm.

The sequence of method steps 202 to 208 may correspond to the initial calibration described above.

In a subsequent method step 210, the calibration plate 36 may be removed from the system. However, in some embodiments of the invention, the calibration plate 36 may remain on the work base 14, such that layers of work material 16 may lead hereon be arranged on the work base 14 and/or on the calibration plate 36.

The method 200 further comprises a step 212 of dispensing a layer of work material 16 on the work base 14. The step 212 may comprise a step of moving down the work base 14 by a distance corresponding at least to a thickness of the layer of work material 16 dispensed or to be dispensed on the work base. The work base 14 may be moved down before or after a layer of work material 16 is dispensed on the work base 14.

In a subsequent method step 214, reference marks 24 are generated by the one or more laser devices 20 on the work material 16 as explained above.

In a subsequent method step 216, the work field is scanned by the optical detector 40, whereby the reference marks 24 generated on the work material 16 are detected by the optical detector 40.

In a subsequent method step 218, the one or more laser devices 20 of the system are recalibrated based on the reference marks 24 generated on the work material 16 as explained above. The system may be configured for generating in method step 218 fewer reference marks than in method step 204.

In a subsequent method step 220, the work material 16 is laser processed using the at least one laser device 20 of the system 10 for forming one or more workpieces.

The sequence of method steps 212 to 220 can correspond to a sequence of additive manufacturing and subsequent calibrations or recalibrations as described above and may be cyclically repeated until the workpiece or workpieces being manufactured is completed.

Figure 8:
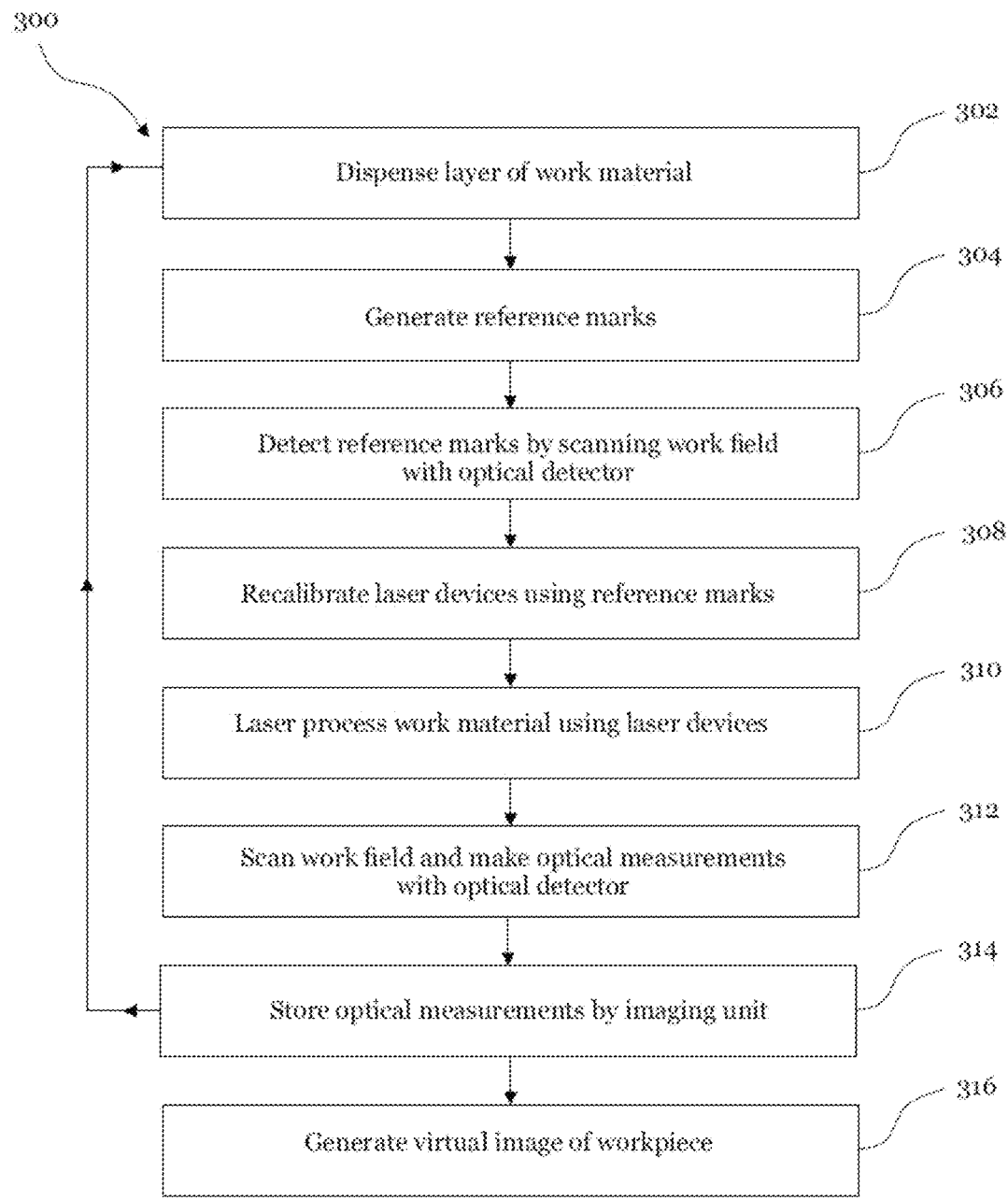
FIG. 8 shows a flow diagram representing a method according to another embodiment of the invention.

FIG. 8 shows a flow diagram illustrating a method 300 of calibrating one or more laser devices of a laser processing system according to another embodiment of the invention. The method 300 represented in FIG. 8 may be better understood by referring to the additive manufacturing systems 10 shown in any of FIGS. 1 to 5, since the method 300 may be a method of calibrating the one or more laser devices 20, 21, 22 of an additive manufacturing system like the system 10 shown in any of FIGS. 1 to 5.

The method 300 comprises a step 302 of dispensing a layer of work material 16 on the work base 14.

In a subsequent method step 304, reference marks 24 are generated by the one or more laser devices 20 on the work material 16 as explained above.

In a subsequent method step 306, the work field is scanned by the optical detector 40, whereby reference marks 24 generated on the work material 16 are detected by the optical detector 40.

In a subsequent method step 308, the one or more laser devices 20 of the system are recalibrated based on the reference marks 24 detected by the optical detector as explained above.

In a subsequent method step 310, the work material 16 is laser processed using the at least one laser device 20 of the system 10 for forming one or more workpieces.

In a subsequent method step 312, the work field 28 is scanned by the optical detector 40 and optical measurements of the work material 16 are made by the optical detector 40.

In a subsequent method step 314, the optical measurements measured by the optical detector 40 are stored by an imaging unit 54 of the system 10.

In a subsequent method step 316, a virtual image of the workpiece formed in the system 10 is generated by the imaging unit 54 based on the optical measurements made by the optical detector 40.

In the embodiment shown, the method steps 302 to 314 may be cyclically repeated for each layer of work material dispensed on the work base of the system and the virtual image is generated to method step 316 once after the sequences of steps 302 to 314 has been carried out for the last layer of work material. However, in other embodiments, the method step 302 to 316 may be cyclically repeated such that different virtual images corresponding to different stages of the manufacturing of the workpiece or the workpieces formed in the system 10 are generated.

Although preferred exemplary embodiments are shown and specified in detail in the drawings and the preceding specification, these should be viewed as purely exemplary and not as limiting the invention. It is noted in this regard that only the preferred exemplary embodiments are shown and specified, and all variations and modifications that presently or in the future may lie within the scope of protection of the invention as defined in the claims are likewise protected.

LIST OF REFERENCE SIGNS 10 laser processing system
12 frame structure
13 transparent part of frame structure
14 work base
16 work material
18 work plane
20 laser device
21 laser device
22 laser device
24 reference marks
25 reference marks
26 reference marks
28 work field
30 laser field
32 laser field
34 laser field
36 calibration plate
40 optical detector
42 illuminating device
44 guiding structure
46a, 46b guiding rails
48a, 48b storage chambers
50 control unit
52 guide control unit
54 imaging unit
56 integrated control
60 housing
100 method
102-106 method steps
200 method
202-220 method steps
300 method
302-316 method steps

The invention claimed is:

1. A laser processing system comprising:
a frame structure;
a work base for supporting a work material, wherein the work base defines a work field in a work plane, wherein the work plane is parallel to the work base;
at least one laser device for projecting a work light on the work plane and/or on the work material, when the work material is disposed on the work base, wherein the at least one laser device is rigidly attached to the frame structure;
wherein each laser device is configured for generating one or more reference marks on the work material and/or on the work plane within a corresponding laser field, wherein the laser field corresponds to at least a part of the work field;
an optical detector for scanning the work field for detecting at least a part of the one or more reference marks generated by each laser device, wherein the optical detector is movable independent from the at least one laser device and is movable with respect to the frame structure with not more than two degrees of freedom; and
a control unit functionally connected to the optical detector and the at least one laser device, wherein the control unit is configured for calibrating the at least one laser device based on the reference marks detected by the optical detector.

2. The system of claim 1 wherein the optical detector comprises an illuminating device configured for illuminating said part of the one or more reference marks, the work field, the work base, and/or the work material.

3. The system of claim 1, wherein the work base is movable with respect to the frame structure in a direction perpendicular to the work plane, and wherein a position of the work base with respect to the frame structure is fixed in two directions parallel to the work plane.

4. The system of claim 1, further comprising a guide control unit for controlling the movement of the optical detector, wherein the guide control unit is configured for moving the optical detector with a scanning speed between 10 and 2000 mm/s.

5. The system of claim 1, wherein the optical detector is configured to scan the work field before or after a layer of work material is dispensed on the work base and/or on the work material or while a layer of work material is dispensed on the work base and/or on the work material.

6. The system of claim 1, further comprising an imaging unit connected to the optical detector, wherein the optical detector is further configured for scanning the work field before a layer of work material is dispensed on the work base and/or on the work material for making a set of optical measurements of one or more workpieces being formed by laser processing the work material, wherein the imaging unit is configured for storing the optical measurements measured by the optical detector for different layers of work material and for generating a virtual image of the one or more workpieces based on the set of optical measurements.

7. The system of claim 1, wherein the system comprises at least one storage chamber for receiving the optical detector, wherein the storage chamber is configured for isolating the optical detector from an exterior of the storage chamber, when the optical detector is within the storage chamber.

8. The system of claim 1, wherein the system comprises a plurality of laser devices, wherein the laser devices are configured for simultaneously laser processing the work material within the corresponding laser field.

9. The system of one of claim 8, wherein at least two of the laser fields cover a common overlapping area, wherein the common overlapping area covers the entire work field or at least a part thereof.

10. The system of claim 1, wherein the control unit is configured for calibrating each of the at least one laser device by adjusting one or more of: a focus position of the work light emitted by the at least one laser device, a position of the laser field, an orientation of the laser field, and a size of the laser field.

11. The system of claim 1, wherein the at least one laser device comprises at least two laser devices and wherein the control unit is configured for calibrating the at least two laser devices with respect to each other by adjusting one or more of: a focus position of the work light emitted by each laser device, a position of each laser field, an orientation of each laser field, and a size of each laser field.

12. The system of claim 1, wherein the laser processing system is an additive manufacturing system, and wherein the at least one laser device is configured for laser processing the work material with work light within a laser field for generating one or more workpieces.

13. The system of claim 1, wherein the optical detector is movable with respect to the frame structure with not more than one degree of freedom.

14. A laser processing system comprising:
a frame structure;
a work base for supporting a work material, wherein the work base defines a work field in a work plane, wherein the work plane is parallel to the work base;
at least one laser device for projecting work light on the work plane and/or on the work material, when the work material is disposed on the work base, wherein the at least one laser device is rigidly attached to the frame structure;
wherein each laser device is configured for generating one or more reference marks on the work material and/or on the work plane within a corresponding laser field, wherein the laser field corresponds to at least a part of the work field;
an optical detector for scanning the work field for detecting at least a part of the one or more reference marks generated by each laser device, wherein the optical detector is movable independent from the at least one laser device and is movable with respect to the frame structure with not more than one degree of freedom; and
a control unit functionally connected to the optical detector and the at least one laser device, wherein the control unit is configured for calibrating the at least one laser device based on the reference marks detected by the optical detector;
wherein the optical detector is movable with respect to the frame structure in one scanning direction, wherein the scanning direction is parallel to the work plane, such that a distance between the optical detector and the work plane and/or the work material in a direction perpendicular to the work plane is fixed;
wherein the optical detector extends in a detection direction parallel to the work plane, wherein the detection direction is perpendicular to the scanning direction, and wherein a length of the optical detector in the detection direction corresponds at least to a length of the work field in the detection direction.

15. The system of claim 14, wherein the detection direction is perpendicular to the scanning direction.

16. The system of claim 15, wherein the scanning direction corresponds to a direction in which the movement of the optical detector with respect to the frame structure has a degree of freedom; and/or wherein the detection direction corresponds to a direction in which the movement of the optical detector with respect to the frame structure has no degree of freedom.

17. The system of claim 15,
wherein the optical detector is movable in the scanning direction for a length corresponding at least to a length of the work field in the scanning direction.

18. A method of calibrating one or more laser devices of a laser processing system, wherein the method comprises:
generating, by each of at least one laser device, one or more reference marks on a work material and/or on a work plane of the system;
detecting, by an optical detector, at least a part of the one or more reference marks by scanning a work field of the system with the optical detector, wherein the work field is coplanar with the work plane, wherein the optical detector is integrated in the laser processing system, and
wherein the optical detector is movable independent from the at least one laser device and is movable with respect to a frame structure with not more than one degree of freedom, wherein the optical detector scans the work field by moving across the work field with said not more than one degree of freedom while the at least one laser device is rigidly attached to the frame structure; and
calibrating the at least one laser device based on the reference marks detected by the optical detector.

19. The method of claim 18, further comprising scanning the work field, by the optical detector, after a layer of work material is dispensed on the work base or while a layer of work material is dispensed on the work base to detect the reference marks.

20. The method of claim 18, wherein the one or more laser devices comprise two or more laser devices, wherein the method comprises:
generating, by each of the two or more laser devices, one or more reference marks on the work material and/or on the work plane of the system;
wherein the optical detector detects at least a part of the one or more reference marks of each of the two or more laser devices by scanning the work field of the system with the optical detector by moving once along a scanning direction.

* * * * *